US012269150B2

(12) United States Patent
Yasutomi

(10) Patent No.: US 12,269,150 B2
(45) Date of Patent: Apr. 8, 2025

(54) DRIVING DEVICE

(71) Applicant: Koki Holdings Co., Ltd., Tokyo (JP)

(72) Inventor: Toshinori Yasutomi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 257 days.

(21) Appl. No.: 17/801,442

(22) PCT Filed: Jan. 29, 2021

(86) PCT No.: PCT/JP2021/003269
§ 371 (c)(1),
(2) Date: Aug. 22, 2022

(87) PCT Pub. No.: WO2021/176909
PCT Pub. Date: Sep. 10, 2021

(65) Prior Publication Data

US 2023/0090859 A1 Mar. 23, 2023

(30) Foreign Application Priority Data

Mar. 5, 2020 (JP) ................................ 2020-037674

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC ................................. B25C 1/06; B25C 1/047
See application file for complete search history.

(56) References Cited

U.S. PATENT DOCUMENTS 3,589,588 A * 6/1971 Vasku ....................... B25C 1/06 227/132
2008/0190986 A1* 8/2008 Chang ....................... B25C 1/06 227/107
(Continued)

FOREIGN PATENT DOCUMENTS

EP 3308907 A1 4/2018
EP 3603891 A1 2/2020
(Continued)

OTHER PUBLICATIONS

Extended European Search Report issued in corresponding European Application No. 21763491.4, dated Mar. 3, 2023 (8 pages).
(Continued)

*Primary Examiner* — Joshua G Kotis
*Assistant Examiner* — Scott A Howell
(74) *Attorney, Agent, or Firm* — Rimon P.C.

(57) ABSTRACT

A driving device capable of reducing the load in any of the plurality of engaging members is provided. The driving device includes an ejection unit to which a fastener is supplied, a striking unit configured to strike the fastener, a rack provided on the striking unit, a wheel provided rotatably, and a plurality of pins provided on the wheel and engaged with and released from the rack, wherein the plurality of pins can change positions in the wheel, and the plurality of pins include a pin located at a first position where the pin can be engaged with the rack and a pin which is located behind the pin in a rotation direction of the wheel and located at a second position where the pin cannot be engaged with the rack when the striking unit is actuated in the direction of striking the fastener.

14 Claims, 14 Drawing Sheets

(56) References Cited

U.S. PATENT DOCUMENTS

| | | | | |
|---|---|---|---|---|
| 2016/0288305 | A1* | 10/2016 | McCardle | B25C 1/047 |
| 2018/0126527 | A1 | 5/2018 | Pomeroy et al. | |
| 2018/0126530 | A1 | 5/2018 | Pomeroy et al. | |
| 2018/0154505 | A1* | 6/2018 | Sato | B25C 1/047 |
| 2020/0215672 | A1 | 7/2020 | Pomeroy et al. | |
| 2021/0031347 | A1 | 2/2021 | Sato et al. | |
| 2021/0101272 | A1 | 4/2021 | Saitou et al. | |
| 2021/0138622 | A1 | 5/2021 | Enta et al. | |
| 2023/0090859 | A1* | 3/2023 | Yasutomi | B25C 1/06 227/8 |
| 2024/0051106 | A1* | 2/2024 | Yang | B25C 5/1627 |

FOREIGN PATENT DOCUMENTS

| | | | |
|---|---|---|---|
| JP | 2016-209942 | A | 12/2016 |
| WO | 2016/199670 | A1 | 12/2016 |
| WO | 2018/180082 | A1 | 10/2018 |
| WO | 2018/198670 | A1 | 11/2018 |
| WO | 2019/214088 | A | 11/2019 |

OTHER PUBLICATIONS

International Search Report issued in corresponding International Application No. PCT/JP2021/003269, dated Apr. 20, 2021 w/English Translation (5 pages).

* cited by examiner

12 : STRIKING UNIT
31 : RACK
39 : WHEEL
42(42X,42Y) : PIN

DRIVING DEVICE

CROSS REFERENCE TO RELATED APPLICATIONS

This application is the U.S. National Phase under 35 U.S.C. § 371 of International Application No. PCT/JP2021/003269, filed on Jan. 29, 2021, which claims the benefit of Japanese Application No. 2020-037674, filed on Mar. 5, 2020, the entire contents of each are hereby incorporated by reference.

TECHNICAL FIELD

The present invention relates to a driving device having a striking unit configured to strike fasteners.

BACKGROUND ART

Patent Document 1 describes an example of a driving device having a striking unit configured to strike fasteners. The driving device described in Patent Document 1 includes an electric motor, a striking unit, a pressure accumulation chamber, a rotating member, an ejection unit, a magazine, and a trigger. The striking unit has a piston that receives the pressure of the pressure accumulation chamber and a driver blade fixed to the piston. The striking unit can be actuated in the first direction and the second direction. The driver blade has a rack.

The rotating member has a plurality of engaging members provided along a rotation direction. The rotating member has a guide hole, and one of the plurality of engaging members is provided in the guide hole. The engaging member provided in the guide hole is provided at the rearmost part in the rotation direction of the rotating member. The engaging member provided in the guide hole can move in the radial direction of the rotating member in the guide hole. Further, a metal spring is provided, and the spring biases the engaging member provided in the guide hole to the outer side in the radial direction of the rotating member. The rotating member is rotated by the electric motor. Nails are supplied from the magazine to the ejection unit.

In the driving device described in Patent Document 1, when an operation force is applied to the trigger while the striking unit is stopped, the electric motor is rotated. Then, the plurality of engaging members provided on the rotating member are individually engaged with and separated from the rack provided on the driver blade, and the striking unit is actuated in the second direction. When all the plurality of engaging members are separated from the rack, the striking unit is actuated in the first direction by the pressure of the pressure accumulation chamber. The nail supplied to the ejection unit is struck by the driver blade.

RELATED ART DOCUMENTS

Patent Documents

Patent Document 1: International Patent Application Publication No. 2016-199670

SUMMARY OF THE INVENTION

Problem to be Solved by the Invention

When the plurality of engaging members are individually engaged with the rack and the load is increased, the engaging member provided in the guide hole moves in the radial direction of the rotating member to reduce the load. The inventor of this application has recognized the problem that the other engaging members not provided in the guide hole cannot reduce the load.

An object of the present invention is to provide a driving device capable of reducing the load in any of the plurality of engaging members.

Means for Solving the Problems

A driving device according to an embodiment includes an ejection unit to which a fastener is supplied, a striking unit actuated in a first direction in which the fastener supplied to the ejection unit is struck and a second direction opposite to the first direction, a rack provided on the striking unit, a rotating member provided rotatably, and a plurality of engaging members provided on the rotating member at intervals in a rotation direction of the rotating member and engaged with and released from the rack by rotation of the rotating member, wherein each of the plurality of engaging members can change positions with respect to the rotating member, and the plurality of engaging members include a first engaging member which is located at a first position at which the engaging member is engaged with the rack to actuate the striking unit in the second direction by transmitting a rotational force of the rotating member to the striking unit and a second engaging member which is located behind the first engaging member in the rotation direction of the rotating member and located at a second position where the engaging member cannot be engaged with the rack when the first engaging member is released from the rack and the striking unit is actuated in the first direction.

Effects of the Invention

In the driving device according to the embodiment, each of the plurality of engaging members can move from the first position to the second position in accordance with the load. Therefore, it is possible to reduce the load in any of the plurality of engaging members.

DETAILED DESCRIPTION OF PREFERRED EMBODIMENTS

A typical embodiment among some embodiments included in the driving device according to the present invention will be described with reference to drawings.

Figure 1:
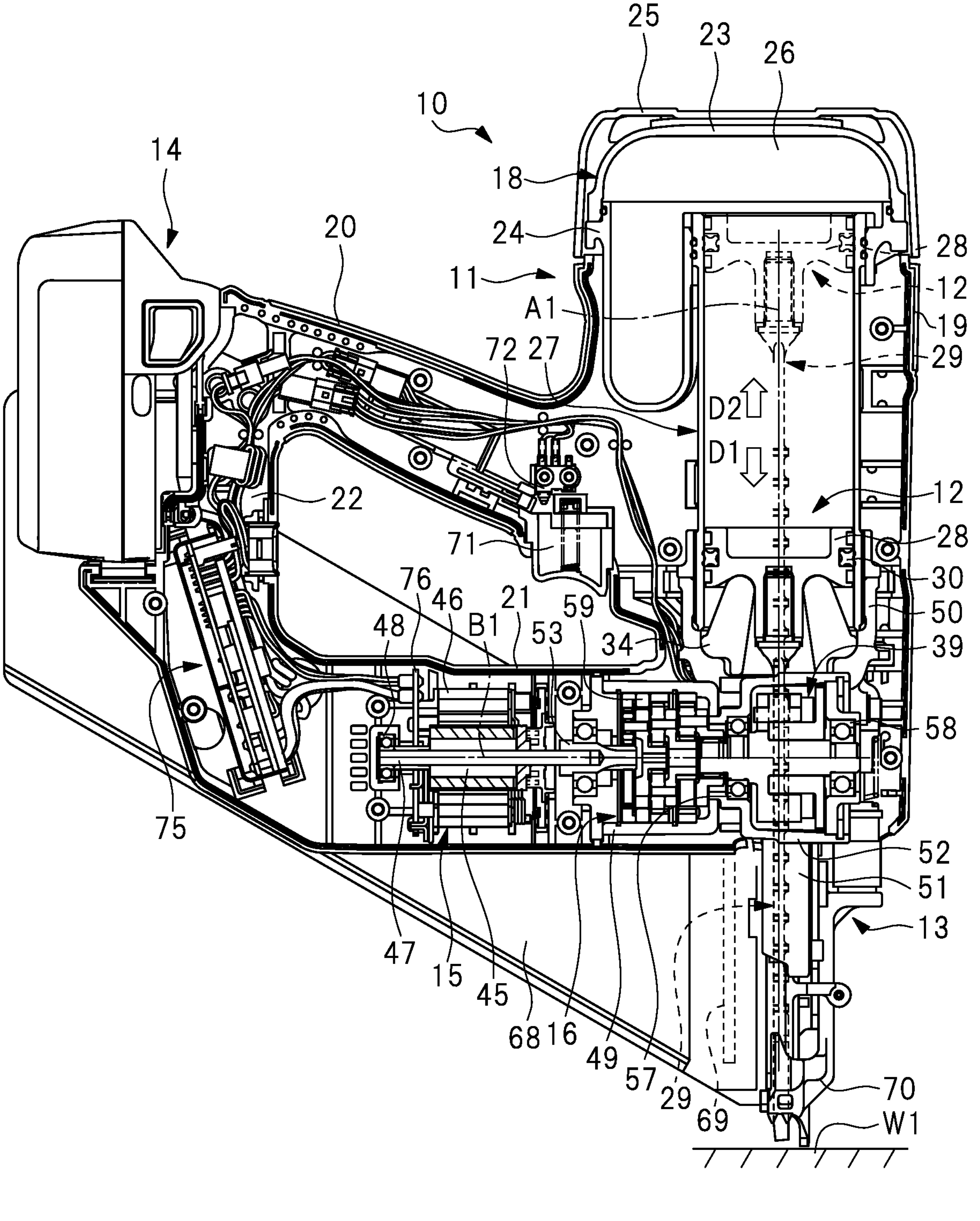
FIG. 1 is a side cross-sectional view showing a nailer according to an embodiment of the present invention.

FIG. 1 shows a nailer 10 which is an example of a driving device. The nailer 10 includes a housing 11, a striking unit 12, a nose unit 13, a power supply unit 14, an electric motor 15, a deceleration mechanism 16, a wheel 39, and a pressure accumulation container 18. The housing 11 has a cylinder case 19, a handle 20 connected to the cylinder case 19, a motor case 21 connected to the cylinder case 19, and a mounting unit 22 connected to the handle 20 and the motor case 21. The power supply unit 14 can be detachably attached to the mounting unit 22. The electric motor 15 is arranged in the motor case 21. The pressure accumulation container 18 has a cap 23 and a holder 24 to which the cap 23 is attached. The head cover 25 is attached to the cylinder case 19, and the pressure accumulation container 18 is arranged over the inside of the cylinder case 19 and the inside of the head cover 25.

The cylinder 27 is housed in the cylinder case 19. The cylinder 27 is made of metal, for example, aluminum or iron. A pressure chamber 26 is formed over the inside of the pressure accumulation container 18 and the inside of the cylinder 27. The pressure chamber 26 is filled with a compressible fluid. As the compressible fluid, an inert gas can be used other than air. Examples of the inert gas include nitrogen gas and noble gas. In this embodiment, an example in which the pressure chamber 26 is filled with air will be described. The nose unit 13 is arranged over the inside and outside of the cylinder case 19. The nose unit 13 has a bumper support portion 50, an ejection unit 51, and a tubular portion 52. The bumper support portion 50 has a tubular shape, and the bumper support portion 50 supports a bumper 34. The bumper 34 has an annular shape and is made of synthetic rubber.

The striking unit 12 is arranged from the inside to the outside of the housing 11. The striking unit 12 has a piston 28 and a driver blade 29. The piston 28 is provided in the cylinder 27. The striking unit 12 can be actuated in the direction along the virtual line A1. The virtual line A1 is a straight line indicating the center line of the cylinder 27. The virtual line A1 is a technological virtual line, and the virtual line A1 does not physically exist. An annular sealing member 30 is attached to the outer peripheral surface of the piston 28. The sealing member 30 is made of synthetic rubber. The sealing member 30 is in contact with the inner peripheral surface of the cylinder 27 to form a sealing surface. Further, the wheel 39 is provided in the tubular portion 52. The wheel 39 is attached to a rotation shaft 40, and the rotation shaft 40 is rotatably supported by bearings 57 and 58. The rotation shaft 40 and the wheel 39 can rotate about the rotation center line B1.

Figure 2:
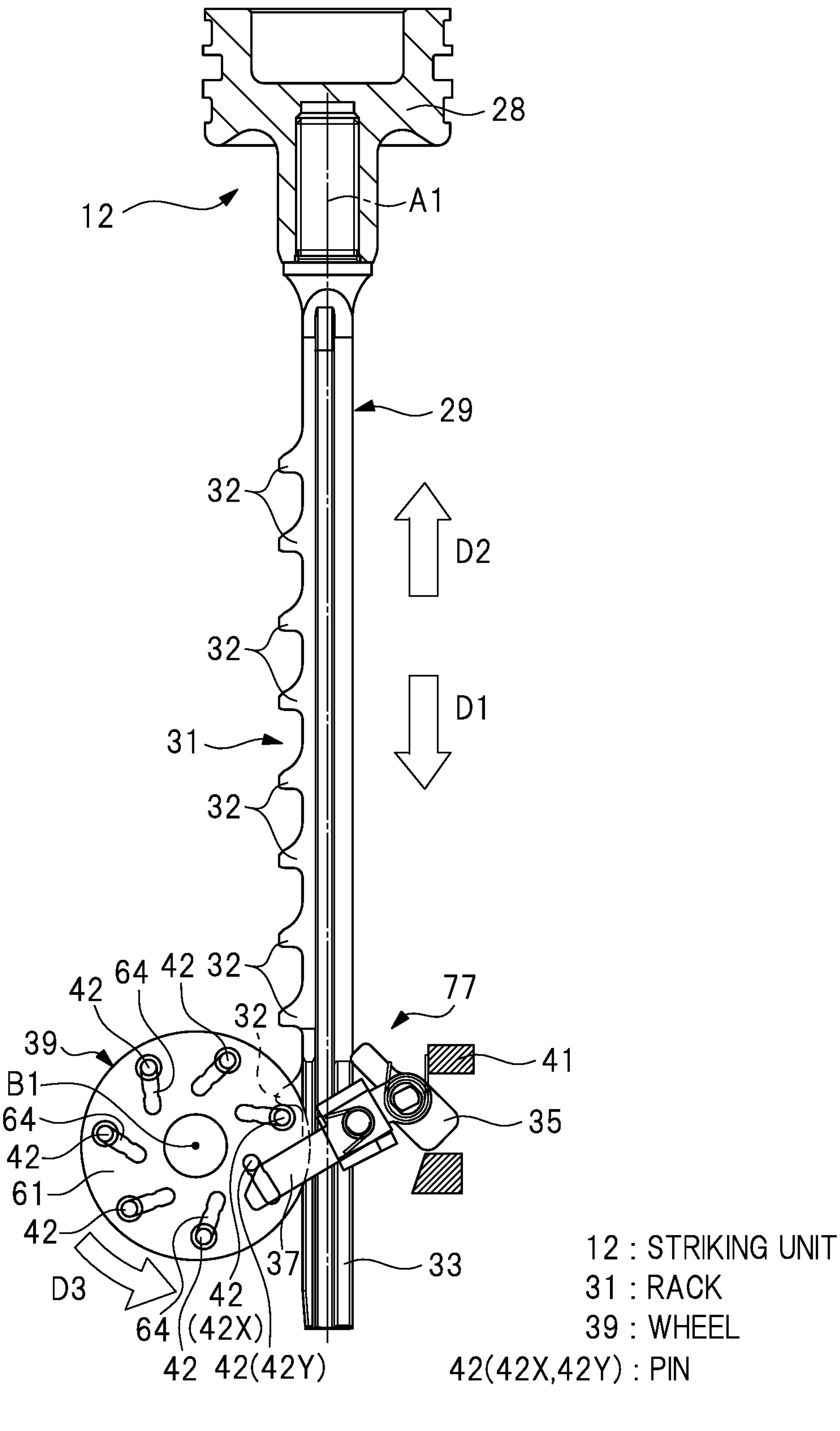
FIG. 2 is a front view showing an overall configuration of a striking unit provided in the nailer.

When the nailer 10 is viewed from the side in a plane including the virtual line A1, the rotation center line B1 and the virtual line A1 intersect at an angle of, for example, 90 degrees. Further, in FIG. 2 showing a plane perpendicular to the rotation center line B1, the rotation center line B1 and the virtual line A1 are arranged apart from each other. The driver blade 29 is made of, for example, metal and the driver blade 29 has a rack 31 and a contact portion 33 shown in FIG. 2. The rack 31 is composed of a plurality of protrusions 32, for example, nine protrusions 32. The nine protrusions 32 are arranged at intervals, for example, equal intervals in the direction along the virtual line A1. The contact portion 33 protrudes from the side surface of the driver blade 29 in the direction along the rotation center line B1. The contact portion 33 is provided near the edge of the driver blade 29 located opposite to the edge where the rack 31 is provided. The contact portion 33 is provided from a position corresponding to the protrusion 32 located farthest from the piston 28 in the actuation direction of the striking unit 12 to the tip of the driver blade 29.

The position of the striking unit 12 in the actuation direction includes the top dead center and the bottom dead center. As shown by the broken line in FIG. 1, the top dead center of the striking unit 12 corresponds to the state in which the end portion of the piston 28 and the end portion of the cylinder 27 are at substantially the same position in the direction along the virtual line A1. As shown by the solid line in FIG. 1, the bottom dead center of the striking unit 12 corresponds to the state in which the piston 28 is in contact with the bumper 34. In this embodiment, the state in which the striking unit 12 is located between the top dead center and the bottom dead center is treated as a stand-by position. The stand-by position of the striking unit 12 corresponds to the state in which the piston 28 is separated from the bumper 34 and the end portion of the piston 28 is below the end portion of the cylinder 27 in FIG. 1.

Figure 3:
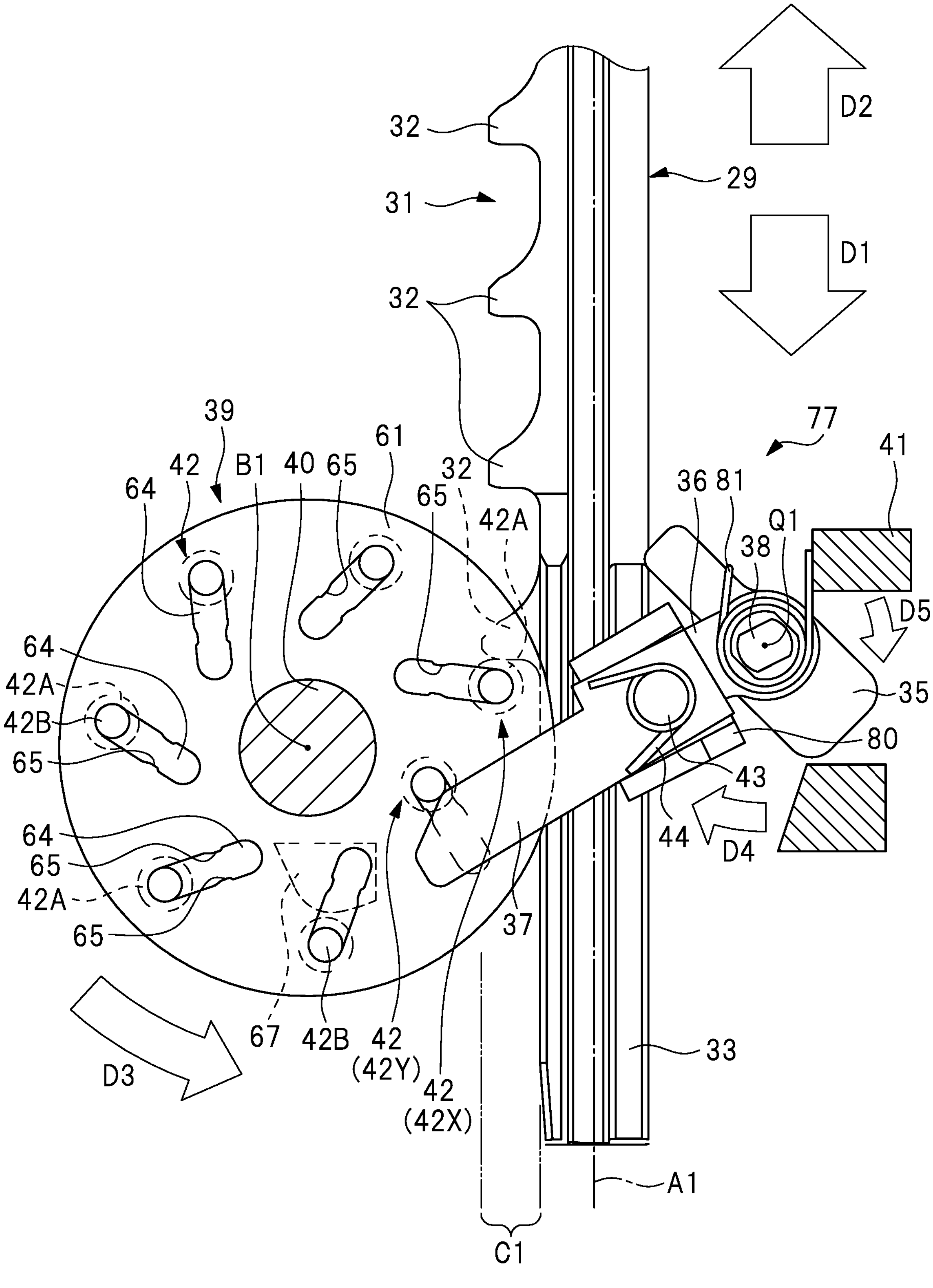
FIG. 3 is a cross-sectional view showing a state in which the striking unit in FIG. 2 is stopped at a stand-by position.
Figure 4:
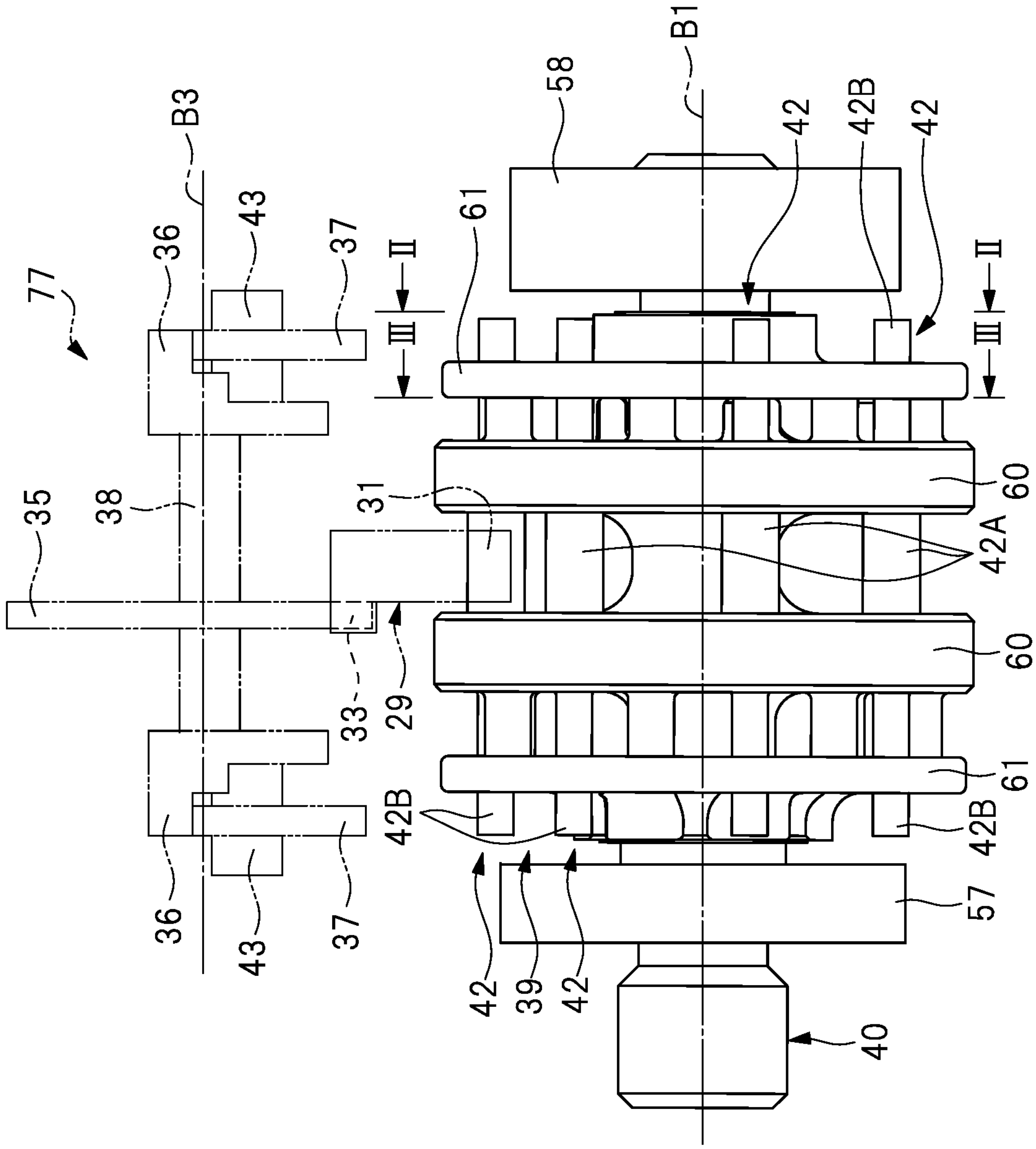
FIG. 4 is a plan view of a wheel provided in the nailer.

FIG. 3 is an enlarged view of the principal part of FIG. 2, and FIG. 4 is a plan view of the wheel 39. A blade latch 35 and wheel latches 36 and 37 are provided in the housing 11. The blade latch 35 and the wheel latches 36 and 37 constitute an adjustment mechanism 77. The blade latch 35 is made of, for example, metal or synthetic resin. The blade latch 35 is non-rotatably fixed to a movable shaft 38. Both the blade latch 35 and the movable shaft 38 can be actuated within a predetermined angle range about the rotation center line B3. The rotation center line B3 is a virtual line passing through the center of the movable shaft 38. In FIG. 3 showing a plane perpendicular to the rotation center line B1, the driver blade 29 is arranged between the movable shaft 38 and the rotation shaft 40 of the wheel 39. The movable shaft 38 is arranged within the arrangement position of the wheel 39 in the direction along the virtual line A1.

Figure 5:
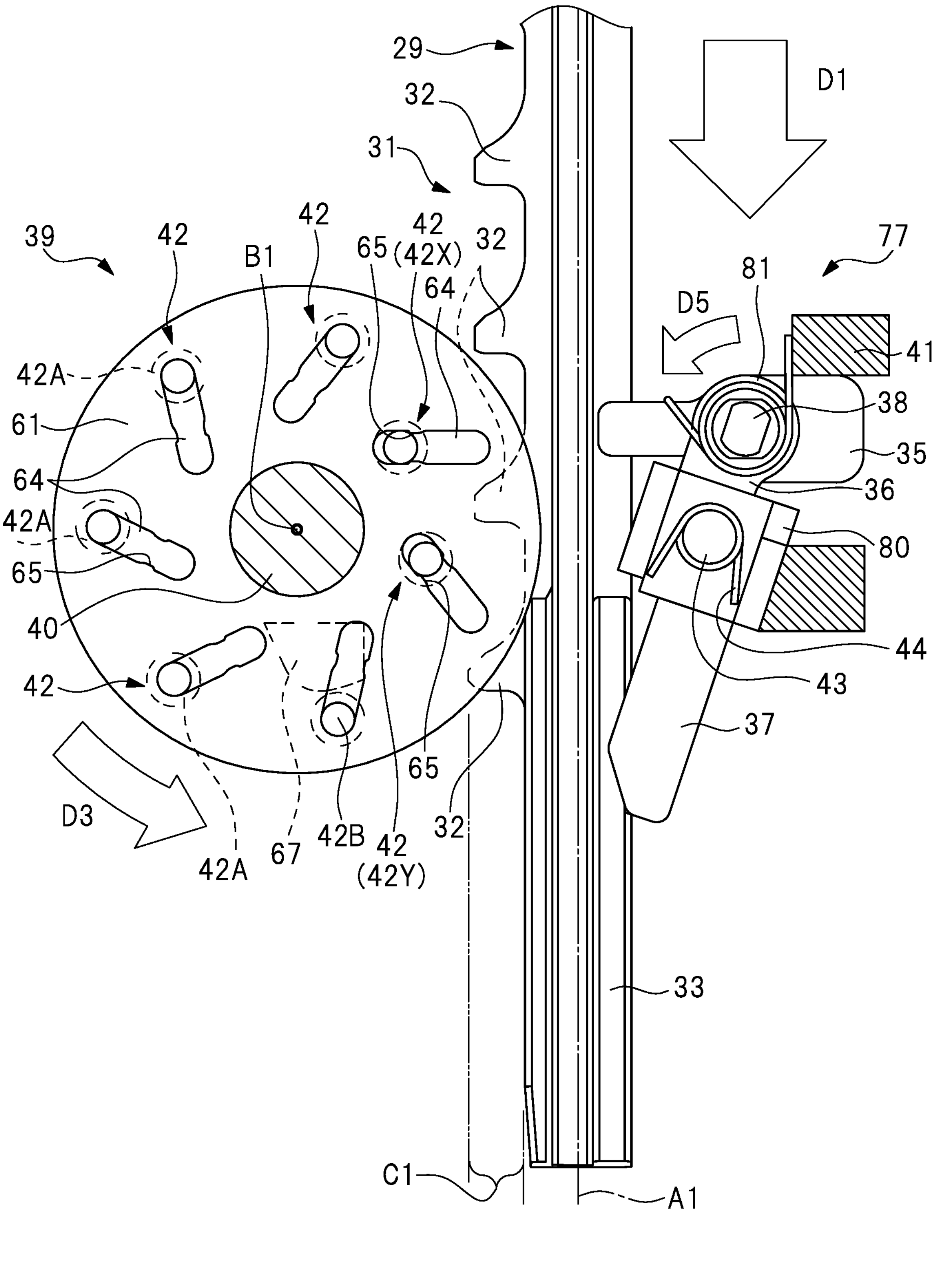
FIG. 5 is a cross-sectional view showing an example in which the striking unit descends.

As shown in FIG. 4, in the direction along the rotation center line B1, at least a part of the arrangement range of the blade latch 35 overlaps with at least a part of the arrangement range of the contact portion 33 of the driver blade 29. A stopper 41 is provided in the housing 11. The stopper 41 is made of metal or synthetic resin. The blade latch 35 is biased by a spring 81 in a counterclockwise direction in FIG. 3. The blade latch 35 is stopped when it is in contact with the stopper 41 as shown in FIG. 5. Two wheel latches 36 are provided so as to interpose the driver blade 29 in the direction along the rotation center line B1, and both the two wheel latches 36 are made of metal or synthetic resin. The two wheel latches 36 are non-rotatably fixed to the movable shaft 38, and the two wheel latches 36 can rotate together with the movable shaft 38 within a predetermined angle range about the rotation center line Q1. A stopper 80 is provided for each of the two wheel latches 36.

Two wheel latches 37 are provided. Both the two wheel latches 37 are made of metal or synthetic resin. The wheel latch 37 is individually attached to the wheel latch 36 so as to be actuated about a support shaft 43. The arrangement positions of the wheel latch 37 and the support shaft 43 are different from the arrangement position of the driver blade 29 in the direction along the rotation center line B1. The wheel latch 37 is biased by a spring 44 in the clockwise direction D4 in FIG. 3, and the wheel latch 37 is stopped in contact with the stopper 80 as shown in FIG. 5.

As shown in FIG. 5, when the blade latch 35 is separated from the contact portion 33, the blade latch 35 is stopped in contact with the stopper 41. When the blade latch 35 is stopped in contact with the stopper 41, the entire wheel latch 37 is stopped outside the arrangement range of the wheel 39 in a plane perpendicular to the rotation center line B1 as shown in FIG. 5. The state in which the entire wheel latch 37 is outside the arrangement range of the wheel 39 corresponds to the stand-by position of the wheel latch 37. When the driver blade 29 is actuated in the second direction D2 and the contact portion 33 comes into contact with the blade latch 35, the blade latch 35 is actuated in the clockwise direction D5 in FIG. 5 against the force of the spring 81. When the blade latch 35 is actuated in the clockwise direction D5 in FIG. 5, a part of the wheel latch 37 enters the arrangement range of the wheel 39 in a plane perpendicular to the rotation center line B1. The state in which a part of the wheel latch 37 is within the arrangement range of the wheel 39 corresponds to the second position of the wheel latch 37.

When the driver blade 29 is actuated in the first direction D1 and the blade latch 35 is separated from the contact portion 33, the blade latch 35 is actuated in the counter-clockwise direction by the force of the spring 81. Then, the tip of the wheel latch 37 moves to the outside of the arrangement range of the wheel 39 in a plane perpendicular to the rotation center line B1. Thereafter, when the blade latch 35 comes into contact with the stopper 41, the blade latch 35 and the wheel latches 36 and 37 are stopped.

As shown in FIG. 1, the electric motor 15 is arranged in the motor case 21. The electric motor 15 has a rotor 45 and a stator 46. The stator 46 is attached to the motor case 21. The rotor 45 is attached to a rotor shaft 47, and the rotor shaft 47 is rotatably supported by the motor case 21 via a bearing 48. The electric motor 15 is a brushless motor, and when a voltage is applied to the electric motor 15, the rotor shaft 47 can rotate forward or backward about the rotation center line B1.

A gear case 49 is provided in the motor case 21. The deceleration mechanism 16 is provided in the gear case 49. The deceleration mechanism 16 includes plural sets of planetary gear mechanisms. An input element of the deceleration mechanism 16 is coupled to the rotor shaft 47 via a power transmission shaft 53. An output element of the deceleration mechanism 16 and the rotation shaft 40 are coupled to each other. The deceleration mechanism 16 is arranged on a power transmission path from the electric motor 15 to the rotation shaft 40. As shown in FIG. 1, a rotation regulating mechanism 59 is provided in the gear case 49. The rotation regulating mechanism 59 enables the rotation shaft 40 to rotate in the counterclockwise direction D3 in FIG. 3 by the rotational force when the electric motor 15 rotates in the forward direction. The rotation regulating mechanism 59 prevents the rotation shaft 40 from rotating clockwise in FIG. 3 when the actuation force of the striking unit 12 in the first direction D1 is transmitted to the wheel 39.

The bearing 57 and the bearing 58 are arranged at an interval in the direction along the rotation center line B1 shown in FIG. 3, and the bearing 57 is arranged between the bearing 58 and the deceleration mechanism 16. The wheel 39 is provided between the bearing 57 and the bearing 58 in the direction along the rotation center line B1. The wheel 39 has two boss portions 60 interposing the driver blade 29 in the direction along the rotation center line B1, two pin holding members 61, and a plurality of pins 42. The two boss portions 60 are provided between the pin holding member 61 and the pin holding member 61 in the direction along the rotation center line B1. Each of the two boss portions 60 and the two pin holding members 61 is made of metal. The two boss portions 60 have an annular shape, and the two boss portions 60 are fixed to the rotation shaft 40. The two pin holding members 61 have an annular plate shape. The pin holding member 61 is fixed to the boss portion 60. A part of the rack 31 is arranged between the two boss portions 60 in the direction along the rotation center line B1. Namely, as shown in FIG. 3 showing a plane perpendicular to the rotation center line B1, a part of the actuation range C1 of the rack 31 of the driver blade 29 overlaps with the arrangement range of the wheel 39.

Figure 6A:
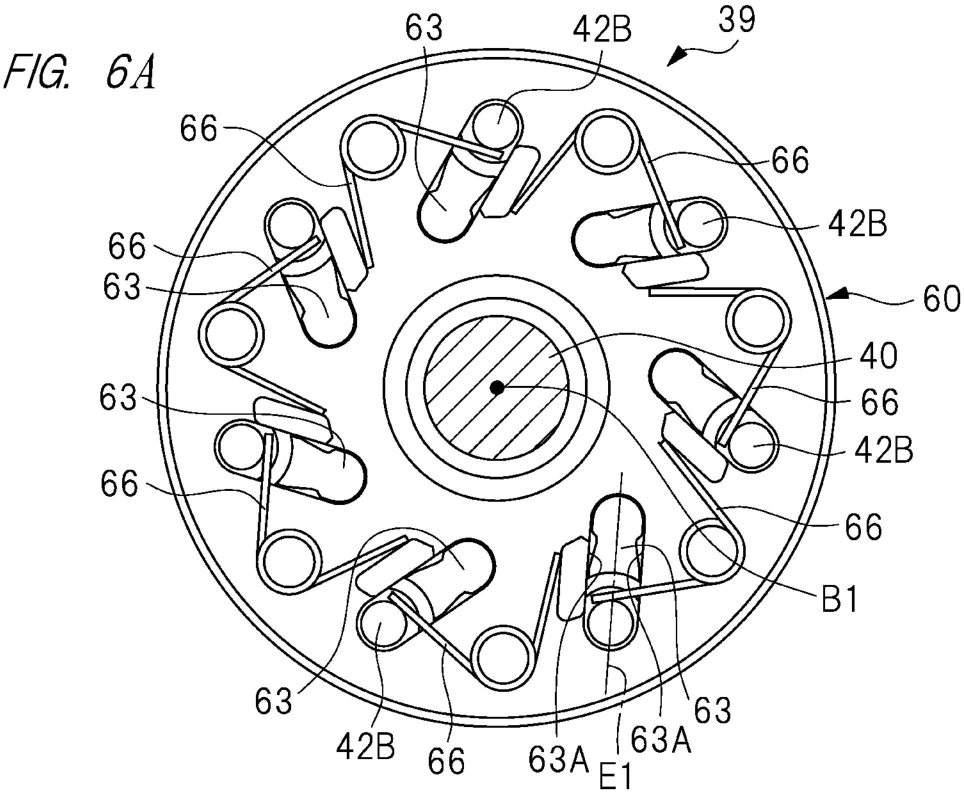
FIG. 6(A) is a cross-sectional view taken along the line II-II in FIG. 4

The two boss portions 60 each have seven support holes 63 shown in FIG. 6(A) as an example of a plurality of guide portions. The seven support holes 63 are provided from an inner side to an outer side in the radial direction of the boss portion 60. Each of the support holes 63 is a long hole. The seven support holes 63 are arranged at intervals in the rotation direction of the wheel 39. The support hole 63 penetrates the boss portion 60 in the direction along the rotation center line B1. Two inner surfaces 63A forming one support hole 63 are substantially parallel to each other. The virtual line E1 passing between the two inner surfaces 63A in a plane perpendicular to the rotation center line B1 does not intersect the rotation center line B1. The circumscribed circle of the support holes 63 is common, and the inscribed circle of the support holes 63 is common. The support holes 63 have the same width in the direction perpendicular to the virtual line E1. The widths of the support holes 63 are the same in each of the two boss portions 60. In the rotation direction of the wheel 39, the positions where the seven support holes 63 are provided are the same in the two boss portions 60, respectively.

As the plurality of pins 42, for example, seven pins 42 are provided. The seven pins 42 are metal shaft members, and the seven pins 42 each have a large diameter portion 42A and small diameter portions 42B as shown in FIG. 4. The small diameter portions 42B are provided at two positions in the direction along the rotation center line B1, and the large diameter portion 42A is provided between the small diameter portion 42B and the small diameter portion 42B. The large diameter portion 42A and the small diameter portions 42B are provided concentrically and are directly connected to each other. The diameter of the large diameter portion 42A is larger than the diameter of the small diameter portion 42B, and both the large diameter portion 42A and the small diameter portion 42B have a cylindrical shape. Seven springs 66 are attached to each of the two boss portions 60. The spring 66 is a metal torsion coil spring, and the springs 66 bias the pins 42 to the outer side in the radial direction of the wheel 39, respectively. The radial direction of the wheel 39 means the radial direction of the virtual circle centered on the rotation center line B1.

The two pin holding members 61 both have a disk-like shape. The two pin holding members 61 each have the seven guide holes 64 shown in FIG. 6(B) as an example of a plurality of guide portions. The seven guide holes 64 are provided at intervals in the rotation direction of the wheel 39. The positions where the guide holes 64 are provided are the same in the rotation directions of the two pin holding members 61. The guide holes 64 are provided from an inner side to an outer side in the radial direction of the pin holding member 61. Two inner surfaces 64A forming one guide hole 64 are substantially parallel to each other. In a plane perpendicular to the rotation center line B1, the virtual line E2 passing between the two inner surfaces 64A does not intersect the rotation center line B1, is directed from an inner side to an outer side in the radial direction of the wheel 39, and is inclined to extend to a back side in the rotation direction of the wheel 39.

The circumscribed circle of the guide holes 64 is common, and the inscribed circle of the guide holes 64 is common. All the guide holes 64 have the same width in the direction perpendicular to the virtual line E2. The width of the guide hole 64 is narrower than the width of the support hole 63. In the rotation direction of the wheel 39, the positions where the support holes 63 are provided and the positions where the guide holes 64 are provided are the same. Further, stoppers 65 protruding from the two inner surfaces 64A in a plane perpendicular to the rotation center line B1 are provided.

A part of the large diameter portion 42A of the pin 42 is arranged between the boss portions 60. A part of the small diameter portion 42B of the pin 42 is arranged in the support hole 63 and the guide hole 64. The diameter of the small diameter portion 42B is smaller than the width of the support hole 63 and the width of the guide hole 64, and is larger than the interval between the two stoppers 65. The state in which the pin 42 is located on the outermost side in the radial direction of the wheel 39 in the guide hole 64 as shown in FIG. 6(A) corresponds to the first position. The state in which the pin 42 is located on the innermost side in the radial direction of the wheel 39 in the guide hole 64 corresponds to the second position. A part of the small diameter portion 42B of the pin 42 is arranged between the pin holding member 61 and the bearing 57 and between the pin holding member 61 and the bearing 58 in the direction along the rotation center line B1. A part of the arrangement range of the small diameter portion 42B of the pin 42 and a part of the arrangement range of the wheel latch 37 overlap in the direction along the rotation center line B1.

Figure 6B:
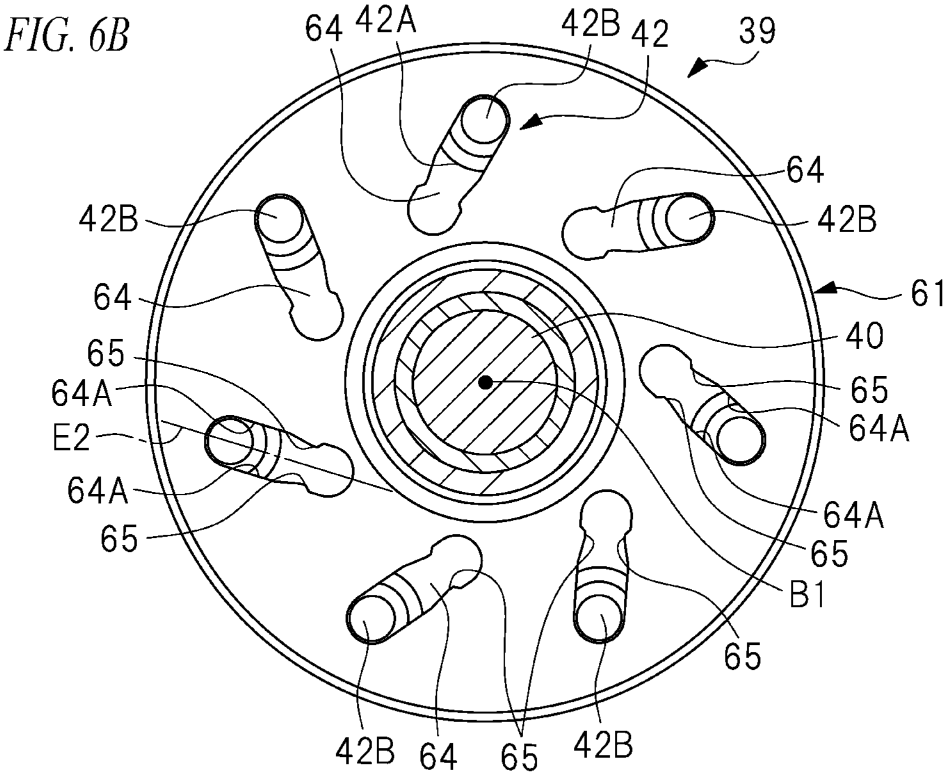
FIG. 6(B) is a cross-sectional view taken along the line III-III in FIG. 4.

Seven which is the number of each of the support holes 63, the guide holes 64, and the pins 42 is smaller than nine which is the number of the protrusions 32 constituting the rack 31. When the wheel 39 is rotated in the counterclockwise direction D3 in FIG. 3, all the seven pins 42 revolve about the rotation center line B1. Further, the small diameter portion 42B of the pin 42 can move in the support hole 63 in the direction along the virtual line E1. The small diameter portion 42B of the pin 42 can move in the guide hole 64 in the direction along the virtual line E2. The seven pins 42 can individually change the positions in the radial direction of the wheel 39. When all the seven pins 42 are stopped at the first position as shown in FIG. 6(B), the seven pins 42 are located at intervals in the rotation direction of the wheel 39. Specifically, the seven pins 42 are located on the same circumference centered on the rotation center line B1 at equal intervals in the rotation direction of the wheel 39. When the stopper 65 comes into contact with the small diameter portion 42B of the pin 42, the pin 42 is restricted from moving in the guide hole 64. However, when the force applied to the pin 42 increases, the stopper 65 is elastically deformed, so that the small diameter portion 42B can get over the stopper 65 and move in the guide hole 64.

A release portion 67 is provided on the inner surface of the tubular portion 52. The release portion 67 is provided in a range of approximately 45 degrees in a range of approximately 180 degrees close to the driver blade 29 in the rotation direction of the wheel 39. The tip of the release portion 67 is provided within the arrangement range of the guide hole 64 in the radial direction of the wheel 39. The release portion 67 extends from between the bearing 57 and the small diameter portion 42B of the pin 42 to between the bearing 57 and the pin holding member 61. Further, the release portion 67 extends from between the bearing 58 and the small diameter portion 42B of the pin 42 to between the bearing 57 and the pin holding member 61. When the wheel 39 is rotated in the counterclockwise direction D3 in FIG. 3, the pin 42 stopped at the second position comes into contact with the release portion 67. The pin 42 is pushed by the release portion 67 to the outer side in the radial direction of the wheel 39 and moves in the guide hole 64. Then, the small diameter portion 42B of the pin 42 gets over the stopper 65 and the pin 42 moves to the first position.

The power supply unit 14 has a storage case and a plurality of battery cells stored in the storage case. The battery cell is a secondary battery that can be charged and discharged, and a known battery cell such as a lithium ion battery, a nickel hydrogen battery, a lithium ion polymer battery, or a nickel cadmium battery can be used as the battery cell as appropriate. Further, the magazine 68 is provided as shown in FIG. 1, and the magazine 68 is supported by the ejection unit 51 and the mounting unit 22. A plurality of nails 69 are housed in the magazine 68. The magazine 68 has a feeder, and the feeder sends the nail 69 in the magazine 68 to the ejection unit. The ejection unit 51 is made of metal or synthetic resin. A push lever 70 is attached to the ejection unit 51. The push lever 70 can be actuated within a predetermined range in the direction of the virtual line A1 with respect to the ejection unit 51.

Figure 7:
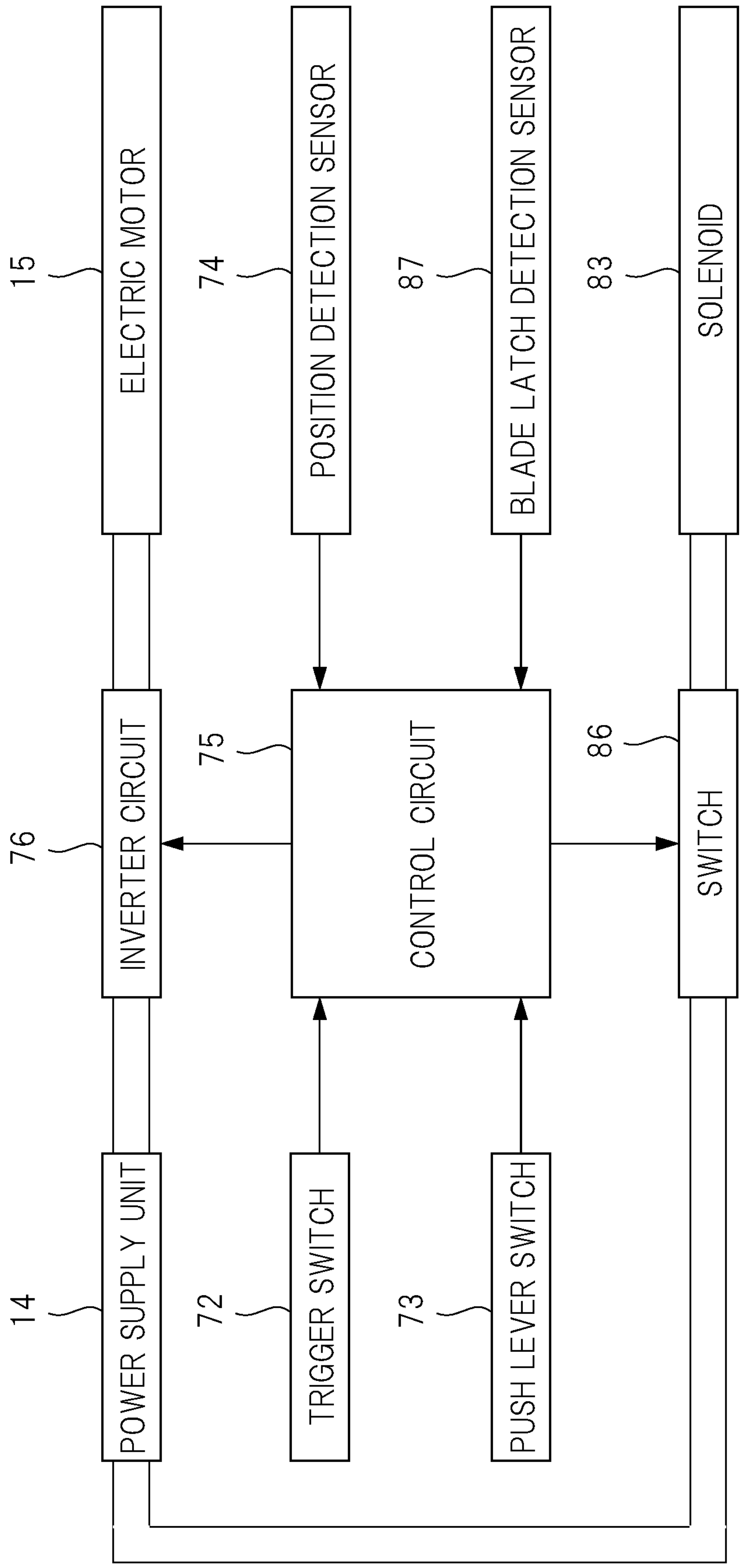
FIG. 7 is a block diagram showing a control system of the nailer.

As shown in FIG. 1, a trigger 71 and a trigger switch 72 are provided on the handle 20. The trigger switch 72 detects the presence or absence of an operation force applied to the trigger 71 and outputs a signal according to the detection result. Further, a push lever switch 73 shown in FIG. 7 is provided in the ejection unit 51. The push lever switch 73 detects whether the push lever 70 is pressed to or separated from a workpiece W1 and outputs a signal according to the detection result. Further, a position detection sensor 74 that detects the position of the striking unit 12 in the direction along the virtual line A1 and outputs a signal according to the detection result is provided.

A control circuit 75 is provided in the mounting unit 22. The control circuit 75 is a microcomputer having an input/output interface, a central processing unit, and a storage unit. Further, an inverter circuit 76 is provided in the motor case 21. The inverter circuit 76 connects and disconnects the stator 46 of the electric motor 15 and the power supply unit 14. The inverter circuit 76 includes a plurality of switching elements, and each of the plurality of switching elements can be turned on and off. The control circuit 75 processes the signal output from the trigger switch 72, the signal output from the push lever switch 73, and the signal output from the position detection sensor 74. The control circuit 75 controls the rotation and stop of the electric motor 15, the rotation speed of the electric motor 15, and the rotation direction of the electric motor 15 by controlling the inverter circuit 76.

An example of using the nailer 10 is as follows. The control circuit 75 stops the electric motor 15 when the operation force to the trigger 71 is released and the push lever 70 is separated from the workpiece W1. The striking unit 12 is stopped at the stand-by position when the electric motor 15 is stopped. The striking unit 12 receives a biasing force in the first direction D1 from the pressure chamber 26. As shown in FIG. 3, one protrusion 32 of the rack 31 is engaged with the pin 42, specifically, the large diameter portion 42A. Therefore, the wheel 39 receives a clockwise rotational force in FIG. 3. The wheel 39 is prevented from rotating clockwise in FIG. 3 by the rotation regulating mechanism 59. Therefore, the striking unit 12 is stopped at the stand-by position. In this embodiment, "the protrusion 32 and the large diameter portion 42A are engaged" is described as "the protrusion 32 and the pin 42 are engaged", and "the large diameter portion 42A is released from the protrusion 32" is described as "the pin 42 is released from the protrusion 32".

When the striking unit 12 is stopped at the stand-by position, one pin 42 (42X) is engaged with one protrusion 32 as shown in FIG. 3. Further, the five pins 42 are located outside the actuation range C1 of the rack 31, and the five pins 42 are each released from the protrusion 32. Each of the five pins 42 located outside the actuation region of the rack 31 is pressed to the inner wall of the support hole 63 by the spring 66 and is stopped at the first position.

Further, in FIG. 3, the end portion of the contact portion 33 is pressed to the blade latch 35 in the direction along the virtual line A1, so that the blade latch 35 is stopped at the position actuated at a predetermined angle in the clockwise direction D5 against the biasing force of the spring 81, that is, at the actuated position. The wheel latch 37 is stopped at a position where a part of the wheel latch 37 is within the arrangement region of the wheel 39, that is, a forward position. The wheel latch 37 is pressed to one pin 42 (42Y) located one position behind the pin 42 (42X) in the rotation direction of the wheel 39. The pin 42 (42Y) to which the wheel latch 37 is pressed is stopped at the second position in the guide hole 64. The second position is out of the actuation region C1 of the rack 31.

The control circuit 75 rotates the electric motor 15 in the forward direction when the operation force is applied to the trigger 71 and the push lever 70 is pressed to the workpiece W1. Then, the wheel 39 is rotated in the counterclockwise direction D3 in FIG. 3, and a biasing force is applied to the striking unit 12 from the pin 42 engaged with the protrusion 32 in the second direction D2. The striking unit 12 is actuated in the second direction D2 from the stand-by position to the top dead center, that is, ascends against the air pressure of the pressure chamber 26. When the striking unit 12 ascends, the air pressure in the pressure chamber 26 is raised.

When the wheel 39 is further rotated, the pin 42 engaged with the protrusion 32 receives an inward component force from the protrusion 32 in the radial direction of the wheel 39, and the pin 42 is released from the protrusion 32. Specifically, the pin 42 is released from the protrusion 32 provided at the position closest to the tip of the driver blade 29 among the plurality of protrusions 32. Then, the striking unit 12 is actuated in the first direction D1, that is, descends by the air pressure of the pressure chamber 26 as shown in FIG. 5. The pin 42 released from the protrusion 32 moves in the guide hole 64 against the biasing force of the spring 66, and the pin 42 is pressed to the stopper 65. Then, the stopper 65 is elastically deformed, and the pin 42 gets over the stopper 65 and is stopped at the second position shown in FIG. 5.

The pin 42 pushed by the wheel latch 37 and held at the second position revolves outside the actuation range C1 of the rack 31. Therefore, the rack 31 does not come into contact with the pin 42 in the process in which the striking unit 12 descends from the top dead center. When the striking unit 12 has descended, the blade latch 35 is separated from the contact portion 33 as shown in FIG. 5, and the blade latch 35 is actuated in the counterclockwise direction D5 by the biasing force of the spring 81. Therefore, the wheel latch 37 is moved to the outside of the arrangement region of the wheel 39 in a plane perpendicular to the rotation center line B1. The blade latch 35 is stopped in contact with the stopper 41, and the wheel latch 37 is stopped at the first position. When the striking unit 12 has descended, the driver blade 29 strikes the nail 69 supplied to the ejection unit 51. The struck nail 69 is driven into the workpiece W1.

After the nail 69 is driven into the workpiece W1, the piston 28 collides with the bumper 34 as shown in FIG. 1. The bumper 34 absorbs a part of the kinetic energy of the striking unit 12. While the striking unit 12 is actuated from the top dead center to the bottom dead center and the striking unit 12 is stopped at the bottom dead center, the pin 42 stopped at the second position is revolved outside the movement region of the rack 31. Therefore, the rack 31 does not come into contact with the pin 42 in the process in which the striking unit 12 descends. In particular, the pin 42 (42Y) shown in FIG. 5 is held at the second position where the pin 42 cannot be engaged with the rack 31.

Figure 8A:
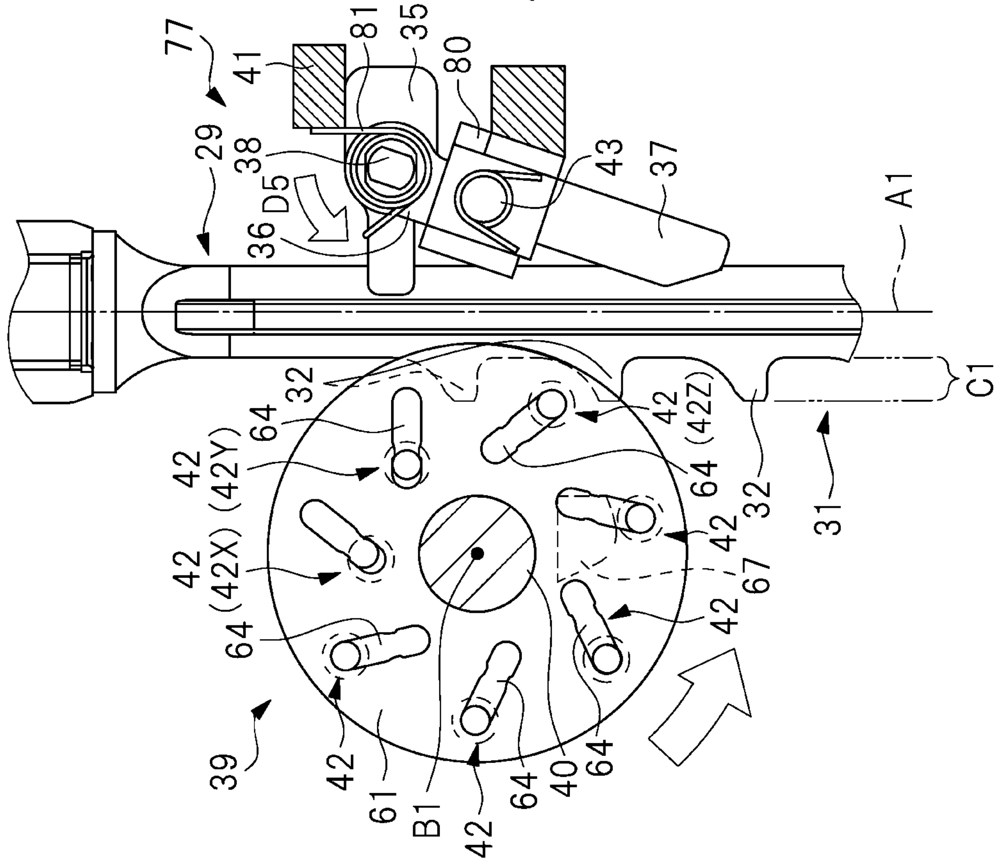
FIG. 8(A) is a cross-sectional view showing an example in which the striking unit is at the bottom dead center and FIG. 8(B) is a cross-sectional view showing an example in which the striking unit ascends from the bottom dead center.

When the nail 69 is driven into the workpiece W1, the push lever 70 is separated from the workpiece W1 by the reaction. However, the control circuit 75 keeps the electric motor 15 rotating. Therefore, as shown in FIG. 8(A), the pin 42 (42Z) located one position behind the pin 42 (42Y) in the rotation direction of the wheel 39 enters between the protrusion 32 and the protrusion 32. The pin 42 (42Z) is stopped at the first position in the guide hole 64, and the pin 42 is engaged with the protrusion 32 with the rotation of the wheel 39. Further, the next pin 42 is engaged with the protrusion 32 while the previously engaged pin 42 is still engaged with the protrusion 32, and when the next pin 42 has been engaged with the protrusion 32, the previously engaged pin 42 is released from the protrusion 32. Note that the pin 42 released from the protrusion 32 is moved to the inner side in the guide hole 64 in the radial direction of the wheel 39 by the component force of the load received from the protrusion 32, and the pin 42 gets over the stopper 65 and is stopped at the second position.

Figure 8B:
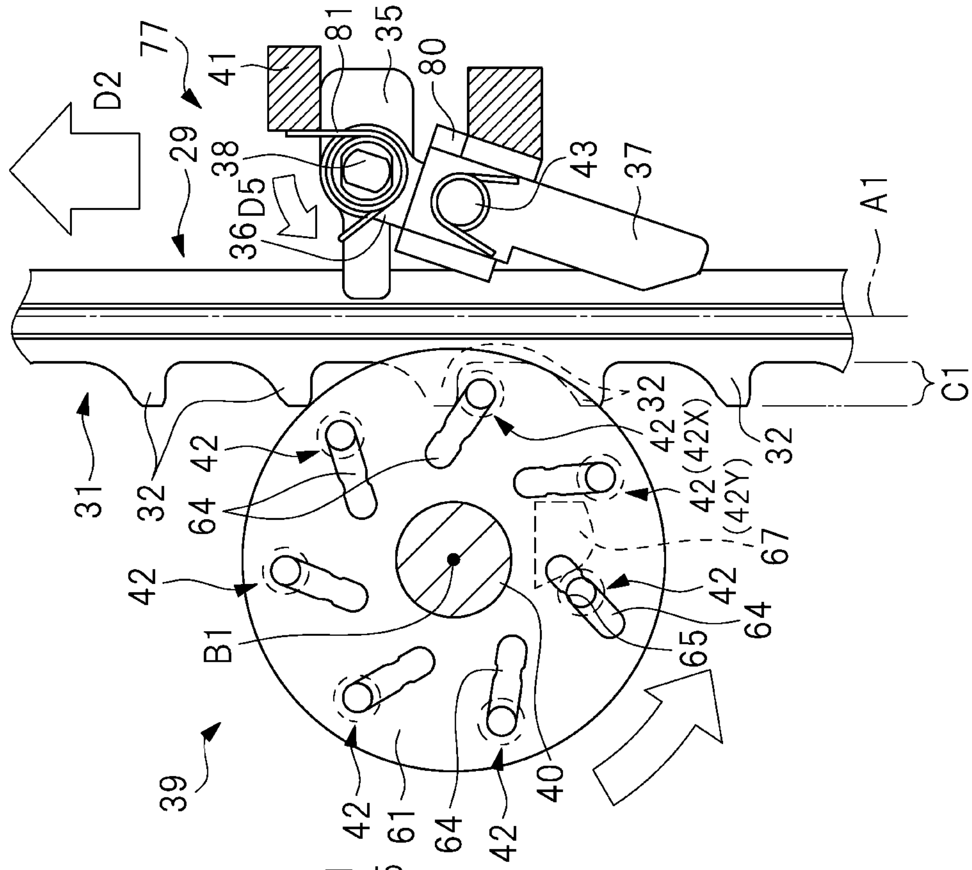

In this way, the pins 42 are repeatedly engaged with and released from the protrusions 32, and the striking unit 12 ascends from the bottom dead center. The pin 42 stopped at the second position is pressed to the release portion 67 by the rotation of the wheel 39 as shown in FIG. 8(B). The pin 42 is biased to the outer side in the guide hole 64 by the release portion 67 in the radial direction of the wheel 39, and the pin 42 gets over the stopper 65. The pin 42 that has got over the stopper 65 is moved in the guide hole 64 by the biasing force of the spring 66 and is stopped at the first position.

When the striking unit 12 further ascends, the contact portion 33 is pressed to the blade latch 35. The blade latch 35 is actuated in the clockwise direction D5 against the biasing force of the spring 81. Further, the wheel latch 37 is actuated in the counterclockwise direction from the first position. Therefore, a part of the wheel latch 37 enters the arrangement region of the wheel 39 in a plane perpendicular to the rotation center line B1. A part of the wheel latch 37 is pressed to one pin 42, and one pin 42 is moved from the first position to the inner side in the guide hole 64 in the radial direction of the wheel 39 against the biasing force of the spring 66.

When the control circuit 75 detects that the striking unit 12 has reached the stand-by position, the control circuit 75 stops the electric motor 15. Therefore, the striking unit 12 is stopped at the stand-by position. When the striking unit 12 is stopped at the stand-by position, the blade latch 35 is stopped as shown in FIG. 3, and the wheel latch 37 is stopped at the second position. The pin 42 to which a part of the wheel latch 37 is pressed gets over the stopper 65 and is stopped at the second position. The adjustment mechanism 77 has a structure and a function of switching the position of the pin 42 in the radial direction of the wheel 39 between the first position and the retracted position.

When the wheel 39 is rotated and stopped in the counterclockwise direction D3 in FIG. 2 and FIG. 3, the operation in which the plurality of pins 42 are sequentially moved from the first position to the second position by the wheel latch 37 is repeated. In this embodiment, the number of pins 42 is smaller than the number of protrusions 32. Namely, the relationship between the pins 42 and the protrusions 32 is not the one-to-one relationship. In other words, the protrusions 32 which are the targets to be engaged and disengaged for all the pins 42 change in each rotation of the wheel 39, and the pins 42 alternately serve as the pins 42Y, 42X, and 42Z.

The nailer 10 according to this embodiment has the following effects.

First Effect

The seven pins 42 can individually move in the guide holes 64 in the radial direction of the wheel 39. Therefore, when the load received from the engaged protrusion 32 increases, the pin 42 is moved to the inner side in the radial direction of the wheel 39 against the biasing force of the spring 66, and the pin 42 is released from the protrusion 32. Therefore, it is possible to reduce the load in any of the seven pins 42. In particular, when the striking unit 12 reaches the top dead center and the pin 42 is released from the protrusion, the maximum value of the load received by the pin 42 is reduced. The situation in which the load received by the pin 42 increases includes a poor engagement between the pin 42 and the protrusion 32.

Second Effect

The seven pins 42 are arranged at equal intervals in the rotation direction of the wheel 39. Further, seven which is the number of pins 42 is smaller than nine which is the number of protrusions 32. Therefore, the rotation angle of the wheel 39 when the striking unit 12 ascends from the bottom dead center to the top dead center can be set to an angle larger than 360 degrees corresponding to one rotation.

Namely, the amount of rotation of the wheel 39 from the time when the pin 42 is engaged with the protrusion 32 and the striking unit 12 is actuated from the bottom dead center in the second direction D2 to the time when the striking unit 12 reaches the top dead center and the pin 42 is released from the protrusion 32, so that the striking unit 12 is actuated in the first direction D1 is larger than one rotation. Specifically, the amount of rotation of the wheel 39 exceeds 360 degrees corresponding to one rotation, and is smaller than 720 degrees corresponding to two rotations.

Therefore, the distance for which the striking unit 12 ascends is a distance equal to or greater than the entire circumferential length of the circumscribed circle of the plurality of pins 42 provided on the wheel 39, and the increase in the outer diameter, that is, the diameter of the wheel 39 can be suppressed. Further, since the wheel 39 is rotated at an angle larger than 360 degrees, the stroke amount for actuating the striking unit 12 from the bottom dead center to the top dead center is increased, and the size of the nail 69 that can be struck by the striking unit 12 can be made as long as possible.

Further, while the wheel 39 is rotated plural times, among the plurality of pins 42, the pins 42 other than one pin 42 (42Y) located behind the pin 42 (42X) engaged with the rack 31 at the time when the striking unit 12 reaches the top dead center are all held at the first position where they can be engaged with the rack 31. Namely, when the striking unit 12 descends, the plurality of pins 42 can be located at the second position outside the actuation range C1 of the rack 31. Therefore, when the striking unit 12 is actuated, it is not necessary to retract the pins 42 in advance from the actuation range C1 through which the rack 31 passes. Namely, when the striking unit 12 ascends, it is possible to suppress "the wheel 39 spins free during the time when the pin 42 moves from the second position to the first position". Therefore, it is possible to shorten the time required when the striking unit 12 is actuated from the bottom dead center to the top dead center.

Third Effect

Since the number of pins 42 and the number of protrusions 32 are different, the protrusions 32 to be engaged with are not specified for the respective pins 42. Therefore, regardless of the positions of the pins 42 in the rotation direction of the wheel 39 and the positions of the protrusions 32 in the actuation direction of the striking unit 12, the striking portion unit 12 can be actuated from the bottom dead center to the top dead center by rotating the wheel 39 in accordance with the length of the rack 31.

Fourth Effect

Among the plurality of pins 42, the pin 42 which is engaged with the protrusion 32 when the striking unit 12 is at the top dead center and which is released from the protrusion 32 at the top dead center of the striking unit 12 receives the maximum load. Here, since the number of pins 42 and the number of protrusions 32 are different, the pin 42 that receives the maximum load differs for each time when the striking unit 12 ascends. Therefore, the wear and deformation of a specific pin 42 can be suppressed, and the life of each pin 42 can be extended.

Another Example of Adjustment Mechanism

Figures 9A, 9B:
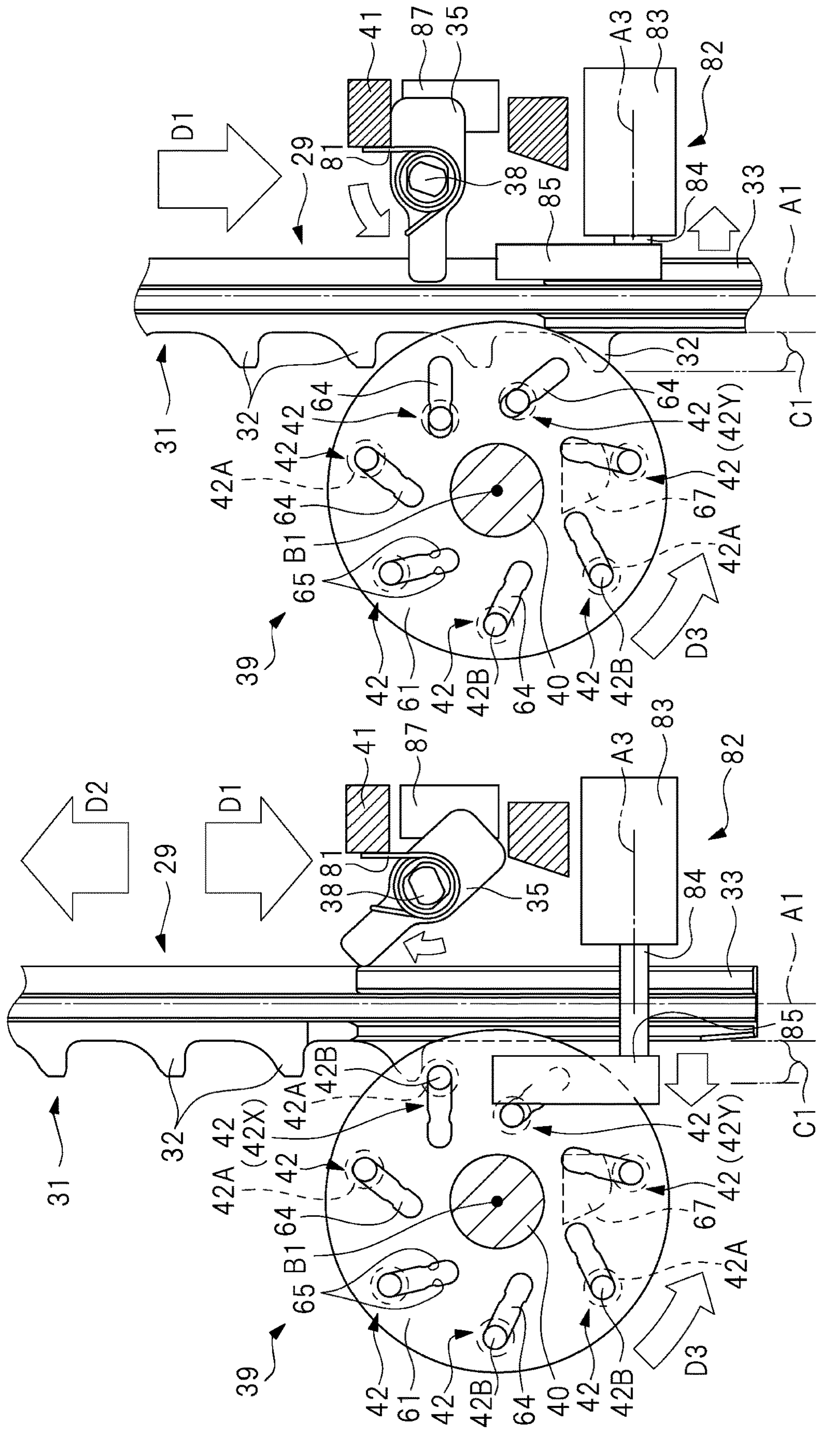
FIG. 9(A) is a cross-sectional view showing another example of an adjustment mechanism in a state in which the striking unit has reached the top dead center and FIG. 9(B) is a cross-sectional view showing the adjustment mechanism in a state in which the striking unit descends.

Another example of the adjustment mechanism provided in the nailer 10 in FIG. 1 is shown in FIG. 9(A) and FIG. 9(B). An adjustment mechanism 82 includes a solenoid 83, a plunger 84, and a pressing member 85 in addition to the blade latch 35. The solenoid 83 has a coil through which an electric current flows. The plunger 84 is made of a magnetic material. Further, a spring that biases the plunger 84 in a direction away from the wheel 39 is provided. The pressing member 85 is attached to the tip of the plunger 84. The pressing member 85 is made of, for example, metal or synthetic resin. The plunger 84 and the pressing member 85 can be actuated in the direction along the virtual line A3. FIG. 9(A) and FIG. 9(B) show the example in which the virtual line A1 and the virtual line A3 intersect at an angle of, for example, approximately 90 degrees.

As shown in FIG. 7, a switch 86 is provided in the electric circuit between the solenoid 83 and the power supply unit 14. Also, a blade latch detection sensor 87 is provided in the housing 11. The blade latch detection sensor 87 detects the position of the blade latch 35 and outputs a signal according to the detection result. The control circuit 75 processes the signal of the blade latch detection sensor 87 and turns on and off the switch 86. When the switch 86 is turned on, a current is supplied from the power supply unit 14 to the solenoid 83. When the switch 86 is turned off, the supply of current to the solenoid 83 is stopped.

When the supply of current to the solenoid 83 is stopped, the pressing member 85 biased by the spring is stopped at the first position separated from the wheel 39. When a current is supplied to the solenoid 83, a magnetic attraction force is generated, the plunger 84 is actuated in a direction approaching the wheel 39 against the biasing force of the spring, and the plunger 84 is stopped at the second position when the pressing member 85 moves into the rotation region of the wheel 39. The solenoid 83 is an actuator that switches the position of the plunger 84 between the first position and the second position. When the adjustment mechanism 82 is provided in the nailer 10 in FIG. 1, the nailer 10 does not include the wheel latches 36 and 37.

An example of using the nailer 10 having the adjustment mechanism 82 is as follows. When the striking unit 12 is stopped at the stand-by position, the pin 42 (42X) is engaged with the protrusion 32, and the pin 42X engaged with the protrusion 32 is held at the first position and is located within the actuation range C1. Further, the contact portion 33 is pressed to the blade latch 35, and the blade latch 35 is stopped at the actuated position. The blade latch detection sensor 87 detects that the blade latch 35 is at the actuated position and outputs a signal according to the detection result. The control circuit 75 turns on the switch 86 by processing the signal of the blade latch detection sensor 87.

Therefore, a current is supplied to the solenoid 83, and the plunger 84 is actuated in a direction approaching the wheel 39. The pressing member 85 is moved into the rotation region of the wheel 39 as shown in FIG. 9(A), and the pressing member 85 is pressed to the pin 42 (42Y). The pin 42 (42Y) is located one position behind the pin 42X in the rotation direction of the wheel 39. Then, the pin 42Y is moved from the first position to the second position against the biasing force of the spring 66 and is held at the second position. Therefore, the plunger 84 is stopped at the second position.

The control circuit 75 rotates the electric motor 15 in the forward direction when the operation force is applied to the trigger 71 and the push lever 70 is pressed to the workpiece W1. Then, the striking unit 12 ascends from the stand-by position toward the top dead center, and the striking unit 12 reaches the top dead center shown in FIG. 9(A). Next, the striking unit 12 descends from the top dead center.

When the striking unit 12 descends, the blade latch 35 is separated from the contact portion 33 as shown in FIG. 9(B), and the blade latch 35 is stopped in contact with the stopper 41. The blade latch detection sensor 87 detects that the blade latch 35 is separated from the contact portion 33 and outputs a signal according to the detection result. Then, the control circuit 75 turns off the switch 86. Therefore, the supply of electric power to the solenoid 83 is stopped, and the plunger 84 is actuated in a direction away from the wheel 39. The plunger 84 is stopped at the first position shown in FIG. 9(B). As a result, the pressing member 85 is stopped outside the rotation region of the wheel 39.

The protrusion 32 does not come into contact with the pin 42 (42Y) in the process in which the striking unit 12 descends. When the striking unit 12 descends, the driver blade 29 strikes the nail 69 supplied to the ejection unit 51. After the nail 69 is driven into the workpiece W1, the striking unit 12 reaches the bottom dead center. After the striking unit 12 reaches the bottom dead center, the electric motor 15 is rotated. Therefore, the striking unit 12 ascends from the bottom dead center. When the striking unit 12 ascends and the contact portion 33 is pressed to the blade latch 35, the blade latch 35 is actuated against the biasing force of the spring 81. Further, when the blade latch detection sensor 87 detects the actuation of the blade latch 35, the control circuit 75 turns on the switch 86. Then, a current is supplied to the solenoid 83, and the plunger 84 is actuated in a direction approaching the wheel 39.

Then, the pin 42 (42Y) to which the pressing member 85 is pressed is moved from the first position and is stopped at the second position, and the plunger 84 is stopped at the second position. When the control circuit 75 detects that the striking unit 12 has reached the stand-by position, the control circuit 75 stops the electric motor 15. When the operation in which the wheel 39 is rotated in the counter-clockwise direction D3 in FIG. 9(A) and is stopped is repeated, the operation in which the plurality of pins 42 are sequentially pushed by the pressing member 85 and are moved from the first position to the second position is repeated. Namely, all the pins 42 alternately serve as the pins 42X and 42Y. The adjustment mechanism 82 may include a servomotor instead of the solenoid 83. The plunger 84 is actuated by the servo motor. Namely, the actuator that actuates the plunger 84 may be either the solenoid 83 or the servomotor. The nailer 10 having the adjustment mechanism 82 can obtain the above-mentioned first effect, second effect, third effect, and fourth effect.

Another Example of Wheel

Another example of the wheel 39 provided in the nailer 10 shown in FIG. 1 is shown in FIG. 10, FIG. 11(A), FIG. 11(B), FIG. 12(A), FIG. 12(B), FIG. 13(A), FIG. 13(B), and FIG. 14. The boss portion 60 has a plurality of support holes 63 arranged along the rotation direction. The pin holding member 61 has a plurality of guide holes 78 arranged along the rotation direction. The plurality of support holes 63 and the plurality of guide holes 78 are provided at the same positions in the rotation direction of the wheel 39. Each guide hole 78 is provided in a predetermined range in the rotation direction of the wheel 39, and is displaced in the radial direction of the wheel 39 as the position in the rotation direction of the wheel 39 changes.

Figure 12A:
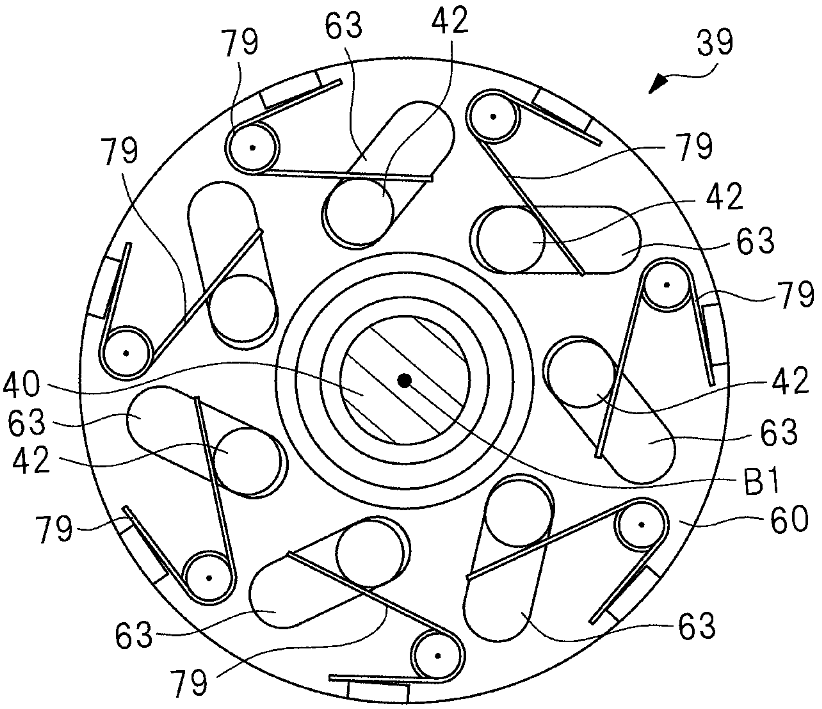
FIG. 12(A) is a cross-sectional view taken along the line IV-IV in FIG. 10
Figure 12B:
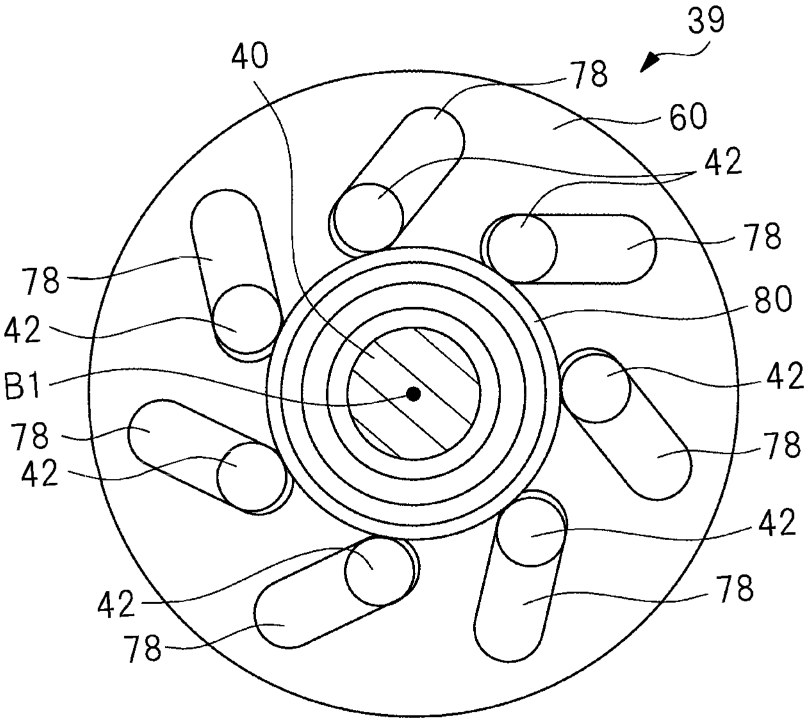
FIG. 12(B) is a cross-sectional view taken along the line V-V in FIG. 10.
Figure 13B:
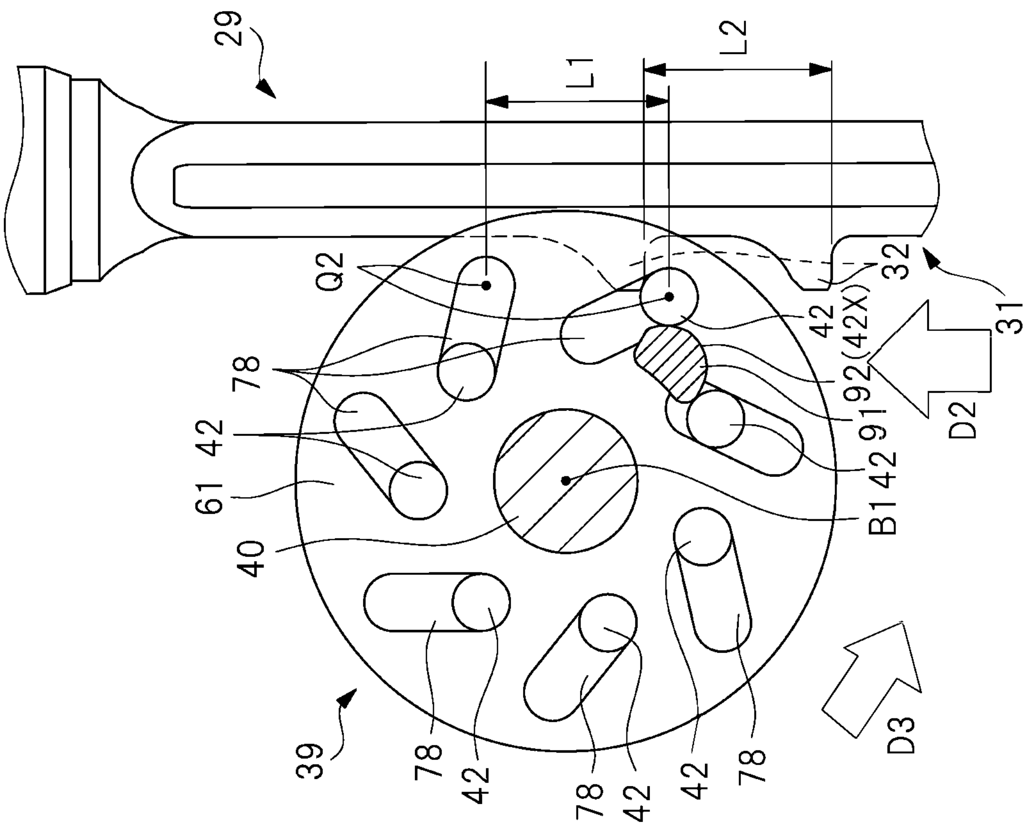
FIG. 13(A) is a front view showing the process in which the striking unit descends and FIG. 13(B) is a front view showing an example in which the striking unit is at the bottom dead center.

The number of support holes 63 and the number of guide holes 78 are the same. The pins 42 are arranged in the support holes 63 and the guide holes 78, respectively. The pins 42 can move individually in the support holes 63 and the guide holes 78, respectively. When the pin 42 moves in the support hole 63 and the guide hole 78 in the rotation direction of the wheel 39, the pin 42 changes its position in the radial direction of the wheel 39. The state in which the pin 42 (42X) is located on the outermost side in the radial direction of the wheel 39 in the guide hole 78 as shown in FIG. 13(B) corresponds to the first position. The state in which the pin 42 is located at the innermost position in the radial direction of the wheel 39 in the guide hole 78 as shown in FIG. 12(B) corresponds to the second position. In the state in which all the pins 42 are stopped at the second position, the seven pins 42 are arranged at intervals in the rotation direction of the wheel 39. Specifically, the seven pins 42 are arranged on the same circumference centered on the rotation center line B1 at equal intervals in the rotation direction of the wheel 39.

Further, assuming the state in which two pins 42 adjacent to each other in the rotation direction of the wheel 39 are located at the first position, there is a distance L1 between the centers Q2 of the pins 42 as shown in FIG. 13(B). On the other hand, the protrusions 32 adjacent to each other on the driver blade 29 are arranged at intervals of pitch L2 in the direction along the virtual line A1. Then, the pitch L2 is larger than the distance L1. Further, assuming the state in which the plurality of pins 42 are located at the first position, the intervals between the pins 42 in the rotation direction of the wheel 39 are equal to each other. The interval between the pins 42 can be defined as, for example, the arc length in a virtual circle passing through the centers Q2. The interval between the pins 42 can be defined as, for example, the arc length between the outer surfaces of the pins 42 in a virtual circle passing through the centers Q1 of the pins 42.

Further, a plurality of springs 79 are provided on the boss portion 60. The springs 79 individually bias the pins 42 to the inner side in the radial direction of the wheel 39. A buffer material 80 is attached to the outer peripheral surface of the rotation shaft 40. The buffer material 80 is a ring made of synthetic rubber, and the pins 42 biased by the springs 79 are stopped at the second position in contact with the buffer material 80.

Figure 13A:
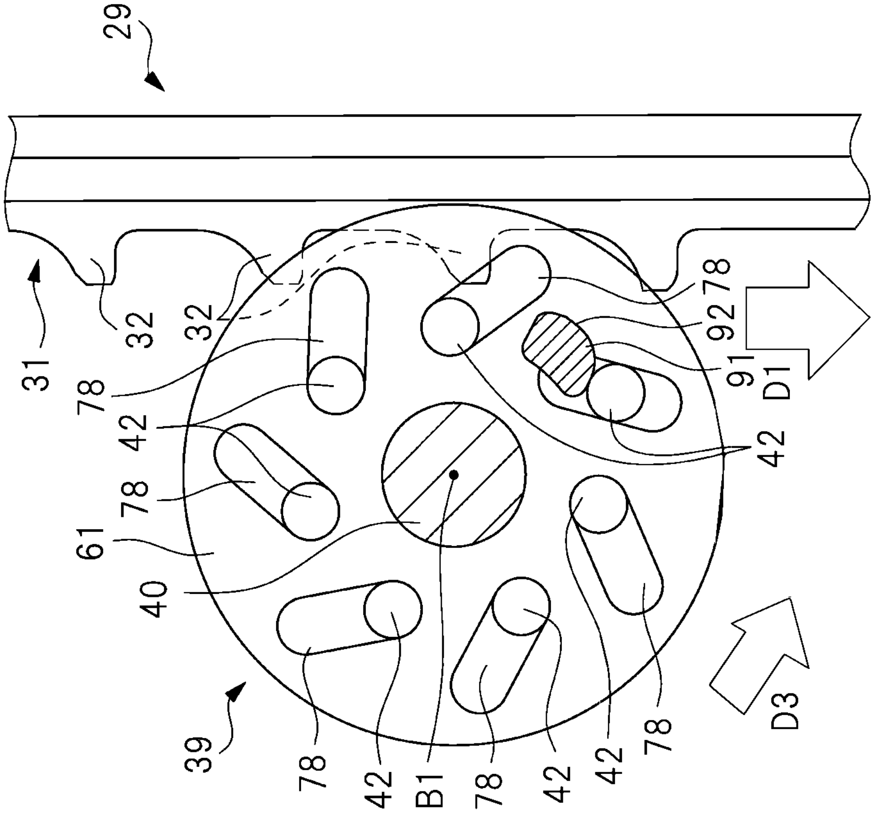
Figure 14:
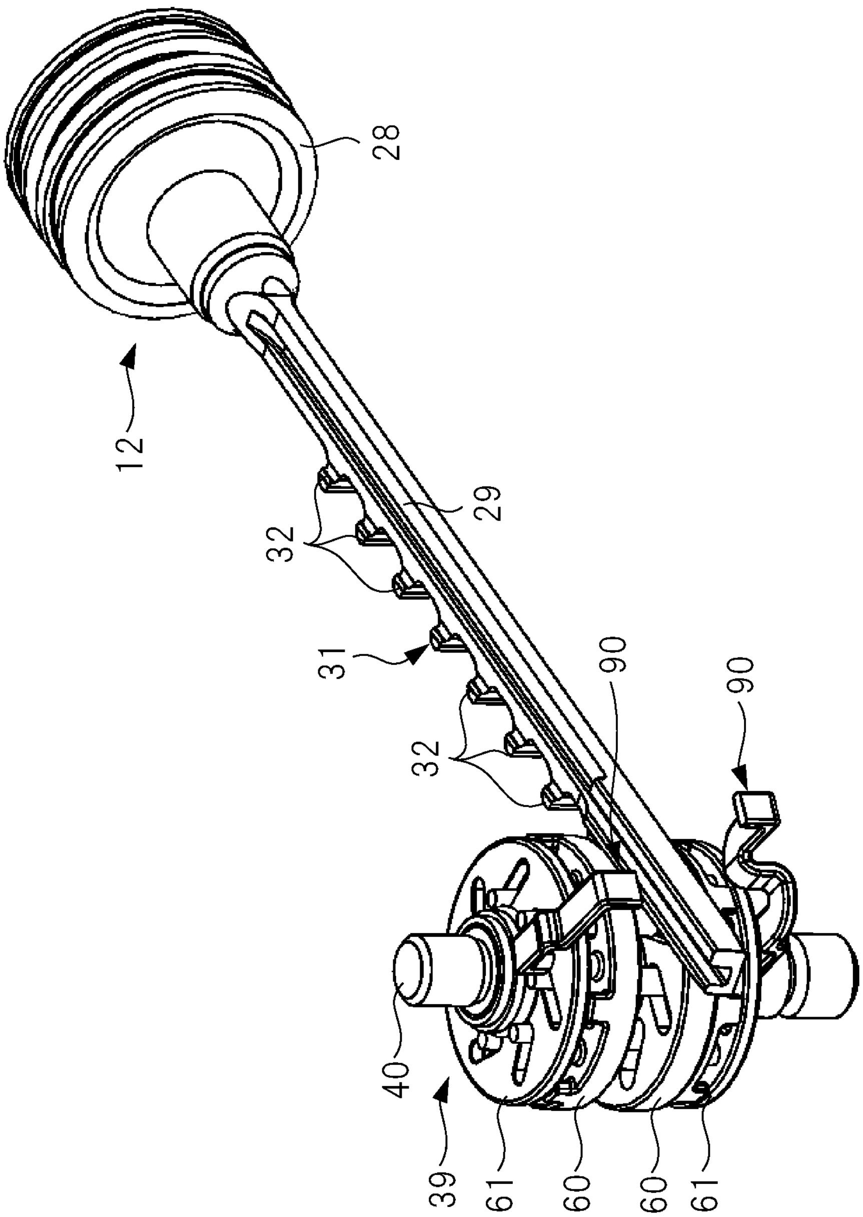
FIG. 14 is a perspective view of the striking unit.

A pin guide 90 is provided in the tubular portion 52 in FIG. 1. The pin guide 90 is fixedly provided in the tubular portion 52. The pin guide 90 may be made of metal or synthetic resin. Two pin guides 90 are arranged at an interval in the direction along the rotation center line B1. The wheel 39 is arranged between the pin guide 90 and the pin guide 90. The pin guide 90 has a rod-like shape, and a tip portion 91 of the pin guide 90 is arranged in the arrangement region of the guide hole 78 in the radial direction of the wheel 39. The other end of the pin guide 90 is fixed to the nose unit 13 in FIG. 1. As shown in FIG. 13(A) and FIG. 13(B), a guide surface 92 is provided on the tip portion 91. The guide surface 92 is curved. When the wheel 39 is rotated counterclockwise in FIG. 12(B), at least one pin 42 comes into contact with the tip portion 91 and gets over the guide surface 92, and the pin 42 gets over the tip portion 91.

Figure 10:
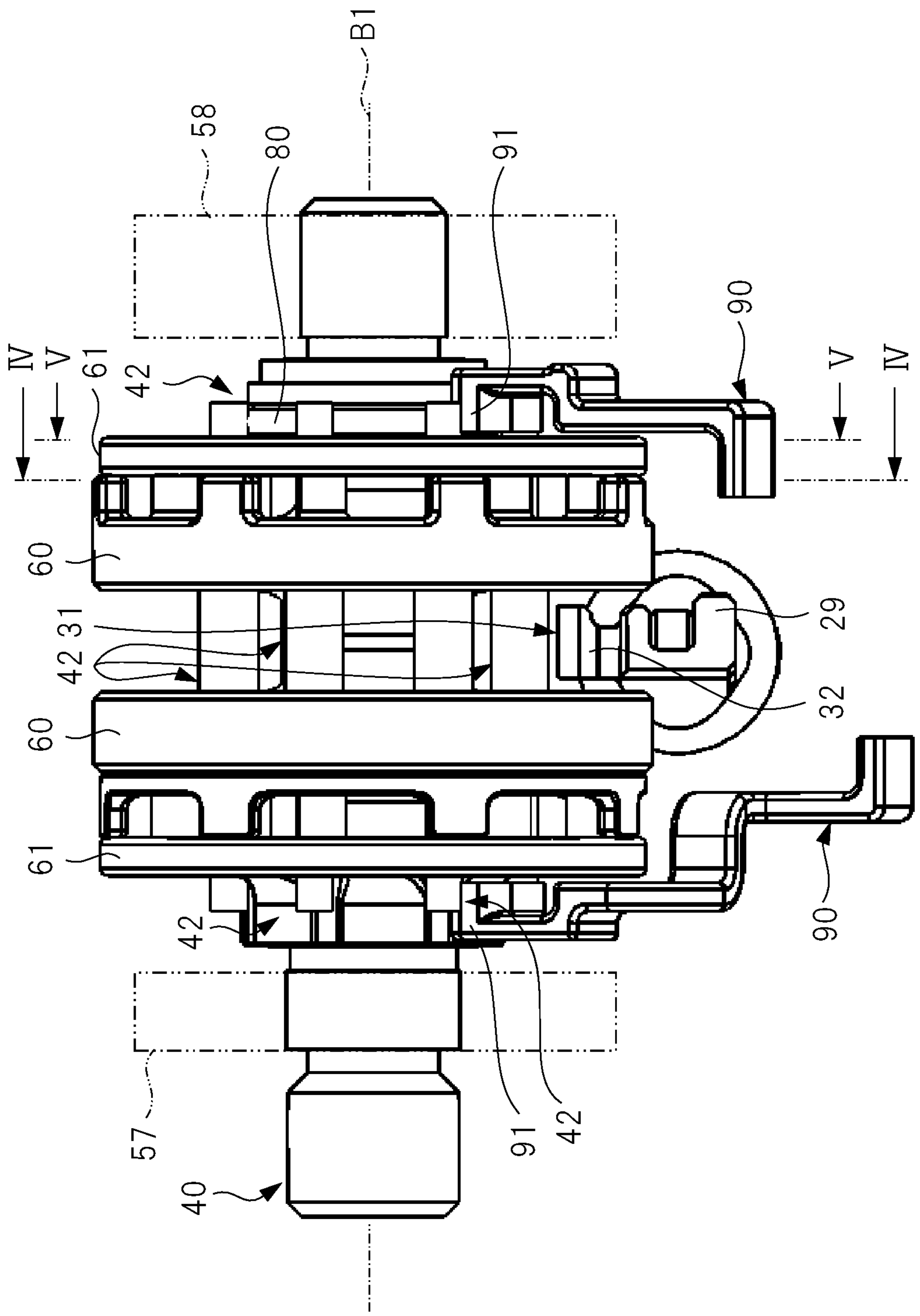
FIG. 10 is a bottom view showing another example of the wheel provided in the nailer.
Figure 11B:
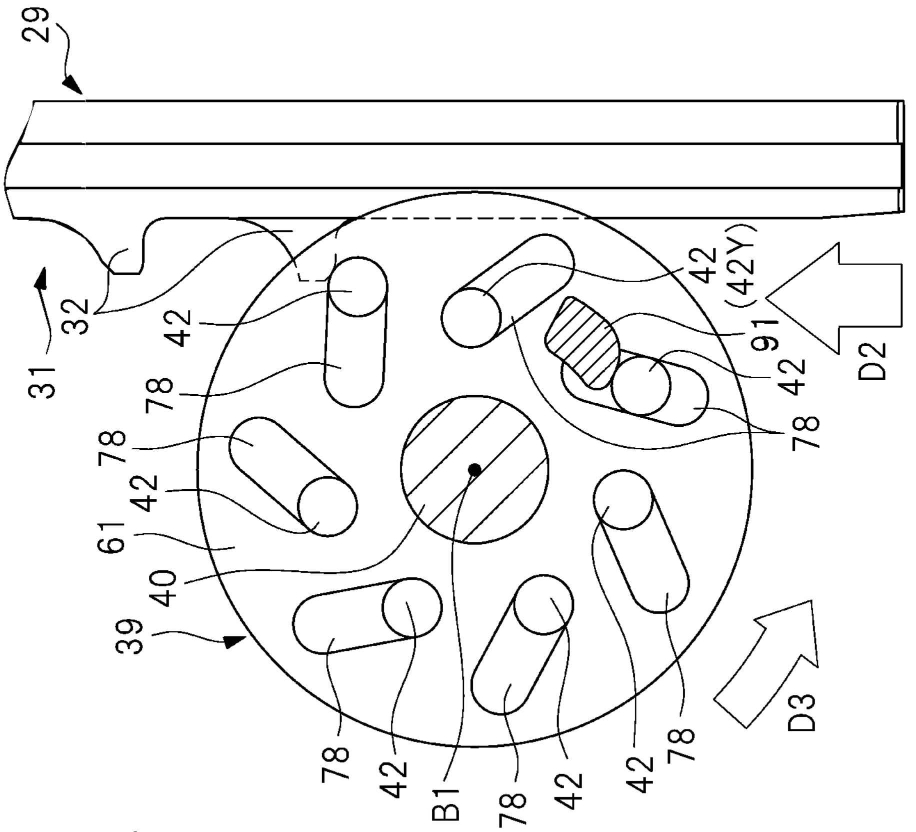
FIG. 11(A) is a front view showing an example in which the striking unit of the nailer having the wheel in FIG. 10 is stopped at the stand-by position and FIG. 11(B) is a front view showing an example in which the striking unit in FIG. 5 has reached the top dead center.
Figure 11A:
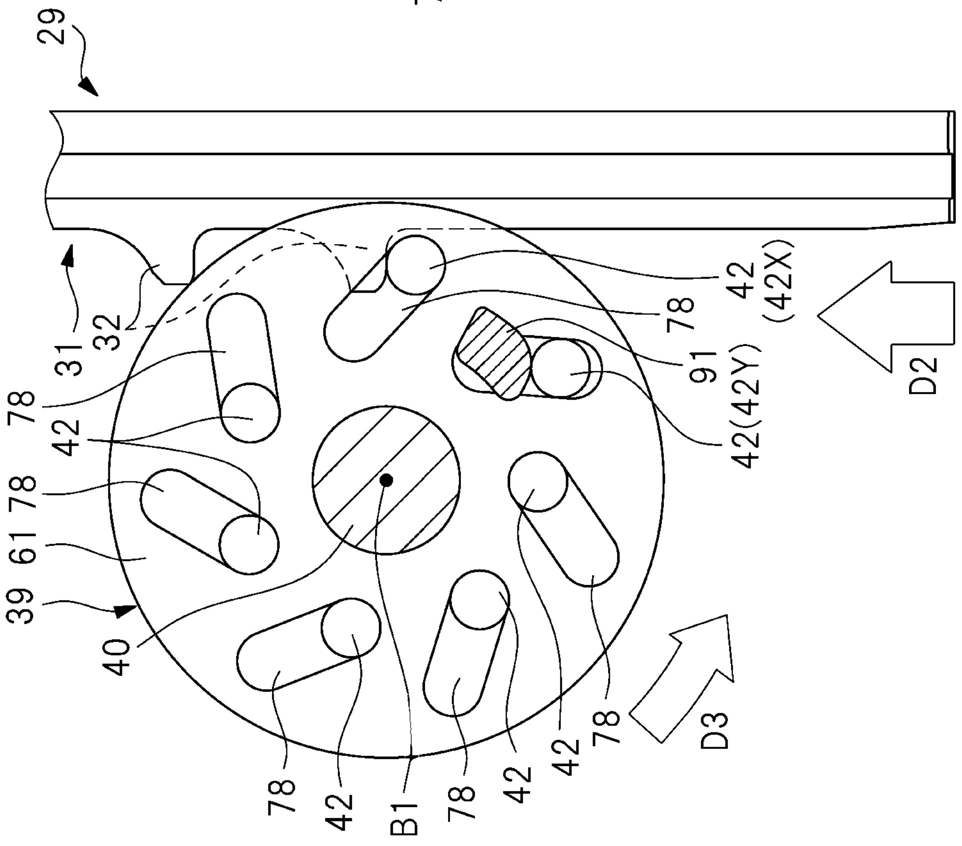

Note that the pins 42 shown in FIG. 11(A), FIG. 11(B), FIG. 12(A), FIG. 12(B), FIG. 13(A), and FIG. 13(B) each have the large diameter portion 42A and the small diameter portion 42B like the pins 42 shown in FIG. 3, FIG. 6(A), and FIG. 6(B). However, the large diameter portions 42A and the small diameter portions 42B of the pins 42 shown in FIG. 11(A), FIG. 11(B), FIG. 12(A), FIG. 12(B), FIG. 13(A), and FIG. 13(B) are omitted. An example of using the nailer 10 having the wheel 39 shown in FIG. 10 is as follows. When the striking unit 12 is stopped at the stand-by position, one pin 42, specifically, the pin 42X is engaged with one protrusion 32 as shown in FIG. 11(A). The pin 42X is biased to the outer side of the wheel 39 by the component force of the external force received from the protrusion 32, and is stopped at the first position. The pin 42X stopped at the first position is located within the actuation range C1.

The pin 42 located one position behind the pin 42X in the rotation direction of the wheel 39, that is, the pin 42Y is in contact with the pin guide 90 and is stopped on the inner side than the first position. The five pins 42 other than the pins 42X and 42Y are released from the protrusion 32, separated from the pin guide 90, and stopped at the second position. The pins 42 stopped at the second position are located outside the actuation range C1. Then, when the wheel 39 is rotated in the counterclockwise direction D3 in FIG. 11(A), the striking unit 12 ascends from the stand-by position to the top dead center. Before the pin 42X is released from the protrusion 32, the pin 42Y is moved to the first position along the guide surface 92, and when the pin 42Y gets over the tip portion 91, the pin 42Y is moved from the first position to the second position by the biasing force of the spring 79. Further, one pin 42 located one position behind the pin 42Y in the rotation direction of the wheel 39 comes into contact with the tip portion 91 and is moved from the second position to the first position.

When the pin 42X is released from the protrusion 32 after the striking unit 12 reaches the top dead center as shown in FIG. 11(B), the striking unit 12 descends by the air pressure of the pressure chamber 26 as shown in FIG. 13(A). When the striking unit 12 has descended, the driver blade 29 strikes the nail 69. The struck nail 69 is driven into the workpiece W1. After the nail 69 is driven into the workpiece W1, the striking unit 12 is stopped at the bottom dead center as shown in FIG. 13(B). In the process in which the striking unit 12 descends from the top dead center to the bottom dead center, all the pins 42 are located outside the actuation range C1 of the rack 31. Therefore, the rack 31 does not come into contact with the pin 42 in the process in which the striking unit 12 descends from the top dead center. In particular, the pin 42Y is held at the second position where it cannot be engaged with the rack 31.

When the wheel 39 is rotated in the counterclockwise direction D3 in FIG. 13B after the striking unit 12 is stopped at the bottom dead center, the pin 42 moved to the first position in the guide hole 78 by the pin guide 90, that is, the pin 42X is engaged with the protrusion 32 before getting over the tip portion 91. Then, the striking unit 12 ascends from the bottom dead center, and when the striking unit 12 reaches the stand-by position as shown in FIG. 11(A), the wheel 39 is stopped. As described above, the pin guide 90 and the spring 79 serve as an adjustment mechanism for moving the pin 42 from the first position to the second position. When the operation in which the wheel 39 is rotated in the counterclockwise direction D3 in FIG. 11(A) and is stopped is repeated, the operation in which the plurality of pins 42 sequentially come into contact with and separated from the tip portion 91 of the pin guide 90 is repeated. Namely, all the pins 42 alternately serve as the pins 42X and 42Y. When the nailer 10 shown in FIG. 1 includes the wheel 39 and the pin guide 90 shown in FIG. 10, the nailer 10 can obtain the above-mentioned first effect, second effect, third effect, and fourth effect.

Further, the pitch L2 is larger than the distance L1. Therefore, after the striking unit 12 reaches the top dead center as shown in FIG. 11(B), the pin 42Y completes the movement from the first position to the second position before the pin 42X is released from the protrusion 32. Therefore, it is possible to reliably prevent the rack 31 from coming into contact with the pin 42. Note that it is also possible to change the timing at which the pin 42Y moves from the first position to the second position by adjusting the arrangement range of the tip portion 91 of the pin guide 90 in the rotation direction of the wheel 39. Among the items described with reference to FIG. 13(B), the item that the intervals between the pins 42 in the rotation direction of the wheel 39 are equal to each other assuming a state in which the plurality of pins 42 are located at the first position applies also to the intervals between the pins 42 disclosed in FIG. 3, FIG. 6(A), and FIG. 6(B).

Supplementary Explanation

Examples of the technical meaning of the configurations described in this embodiment are as follows. The nailer 10 is an example of a driving device. The nail 69 is an example of a fastener. The ejection unit 51 is an example of an ejection unit. The first direction D1 is an example of a first direction. The second direction D2 is an example of a second direction. The striking unit 12 is an example of a striking unit. The rack 31 is an example of a rack. The wheel 39 is an example of a rotating member. The seven pins 42 are an example of a plurality of engaging members. The pin 42X is an example of a first engaging member. The pin 42Y is an example of a second engaging member. In this embodiment, not only one of the pins 42 serves as the first engaging member and not only one of the pins 42 serves as the second engaging member. All the pins 42 serve as both the first engaging member and the second engaging member. The nine protrusions 32 are an example of a plurality of protrusions.

The pressure accumulation container 18 and the cylinder 27 constituting the pressure chamber 26 are an example of a drive unit. The spring 66 and the pin guide 90 are an example of a position changing member. The wheel latch 37, the blade latch 35, and the spring 79 are an example of a moving member. The wheel latch 37 is an example of a first contact member. The blade latch 35 is an example of a second contact member. The seven guide holes 64 are an example of a plurality of guide portions. The stopper 65 is an example of a stopper. The release portion 67 is an example of a release portion.

In this embodiment, the "equal intervals" indicating the positions of the pins 42 in the rotation direction of the wheel 39 and the "equal intervals" indicating the positions of the protrusions 32 provided on the driver blade 29 may be either the "substantially equal intervals" or the "perfectly equal intervals". Further, the "equal intervals" may be defined as "constant intervals" or "uniform intervals". In this case, the "constant intervals" may be either the "completely constant intervals" or the "substantially constant intervals". Further, the "uniform intervals" may be either the "perfectly uniform intervals" or the "substantially uniform intervals". Namely, "equal", "constant", and "uniform" all include processing errors of components, assembly errors of components, dimensional tolerances of components, and the like.

The driving device is not limited to the embodiment disclosed with reference to drawings, and can be variously modified within the range not departing from the gist thereof. For example, the fastener struck by the actuation of the striking unit includes an arch-shaped staple and a tack in addition to a nail. Namely, the driving device includes a stapler for driving arch-shaped staples and a tacker for driving tacks. The rotating member includes a rotation shaft, a pulley, and the like in addition to a wheel. The first engaging member includes a shaft in addition to a pin.

The drive unit that actuates the striking unit in the first direction may be a metal spring, synthetic rubber, or a magnet instead of the pressure accumulation container filled with the compressible fluid. The metal spring or synthetic rubber actuates the striking unit in the first direction by elastic restoring force. When the drive unit is a magnet, the striking unit is made of a magnetic material, for example, iron or steel. The magnet actuates the striking unit in the first direction by an attraction force or a repulsive force. The guide portion provided in the rotating member may be any of a guide hole, a guide groove, a guide rail, and a guide wall. The power supply unit that applies a voltage to the electric motor may be either a DC power supply or an AC power supply. The number of pins may be larger than seven or smaller than seven. The number of protrusions may be larger than nine or smaller than nine. The number of pins can be set to be smaller than the number of protrusions. Further, the "rack" can be defined as an "engaged unit" with which a plurality of engaging members are individually engaged and disengaged.

The first position of the engaging member disclosed in this embodiment can be defined also as an initial position or an engageable position. The second position of the engaging member can be defined also as a retracted position or a non-engageable position. The engaging member located at the first position is engaged with the rack when the rotating member is rotated. The engaging member located at the second position is not engaged with the rack even when the rotating member is rotated. In the radial direction of the rotating member, the first position is on the outer side of the second position. Then, when the engaging member is located at the first position in the radial direction of the rotating member and the engaging member is located within the actuation range C1, the engaging member can be engaged with the rack. On the other hand, when the engaging member is located at the first position in the radial direction of the rotating member and the engaging member is located outside the actuation range C1, the engaging member cannot be engaged with the rack. Further, when the striking unit is actuated in the first direction, it is sufficient if at least one engaging member is moved from the first position to the second position by the adjustment mechanism.

REFERENCE SIGNS LIST

10 . . . nailer, 12 . . . striking unit, 18 . . . pressure accumulation container, 27 . . . cylinder, 31 . . . rack, 32 . . . protrusion, 35 . . . blade latch, 37 . . . wheel latch, 39 . . . wheel, 42 . . . pin, 51 . . . ejection unit, 64 . . . guide hole, 65 . . . stopper, 66, 79 . . . spring, 67 . . . release portion, 69 . . . nail, 90 . . . pin guide, D1 . . . first direction, D2 . . . second direction

The invention claimed is:

1. A driving device comprising:

an ejection unit to which a fastener is supplied;

a striking unit operative to move in a first direction to hit the fastener supplied to the ejection unit and to move in a second direction, which is opposite to the first direction and wherein the striking unit has a rack; and a rotating member operative to rotate, wherein the rotating member includes a plurality of engaging members that are arranged at intervals along a rotation direction of the rotating member and that are engaged with and released from the rack by rotation of the rotating member, wherein each of the plurality of engaging members are movable between a first position of the rotating member which allows the engaging member to be engaged with the rack and a second position of the rotating member which does not allow the engaging member to be engaged with the rack, wherein a distance between the first position and a rotating center of the rotating member is longer than a distance between the second position and the rotating center of the rotating member, and a center of each engaging member moves between the first position and the second position, wherein the plurality of engaging members include:

a first engaging member configured to engage with the rack to move the striking unit in the second direction by transmitting a rotational force of the rotating member to the striking unit when positioned at the first position, and is released from the rack to allow the striking unit to move in the first direction by rotation of the rotating member; and a second engaging member which is located behind the first engaging member in the rotation direction of the rotating member, and wherein the second engaging member is located at the second position when the first engaging member is released from the rack and the striking unit is allowed to move in the first direction.

2. The driving device according to claim 1, wherein the plurality of engaging members, when located at the first position, are at equal intervals with each other.

3. The driving device according to claim 1, wherein all the plurality of engaging members are movable between the first position and the second position.

4. The driving device according to claim 1, wherein the striking unit is operative to move from a bottom dead center in the second direction to reach a top dead center, and is operative to move in the first direction from the top dead center, and wherein an amount of rotation of the rotating member from a time when the first engaging member is engaged with the rack and the striking unit moves from the bottom dead center in the second direction to a time when the striking unit reaches the top dead center and the first engaging member is released from the rack to allow the striking unit to move in the first direction is larger than one rotation.

5. The driving device according to claim 1, wherein the rack has a plurality of protrusions provided at intervals in the first direction of the striking unit, and wherein a number of the plurality of engaging members is smaller than a number of the plurality of protrusions.

6. The driving device according to claim 1, further comprising:

a drive unit configured to actuate the striking unit in the first direction.

7. The driving device according to claim 1, further comprising:

a moving member configured to move the second engaging member from the first position to the second position.

8. The driving device according to claim 7, wherein the moving member includes a first contact member which comes into contact with and is released from each of the plurality of engaging members, and wherein the first contact member moves the second engaging member from the first position to the second position by coming into contact with the second engaging member.

9. The driving device according to claim 8, wherein the moving member includes a second contact member which comes into contact with the striking unit, thereby actuating the first contact member.

10. The driving device according to claim 1, wherein the plurality of engaging members includes pins arranged about the rotation center of the rotating member.

11. The driving device according to claim 1, wherein the rotating member includes a plurality of guide portions which guide of the plurality of engaging members between the first position and the second position, and wherein each of the plurality of guide portions has a stopper which holds each of the plurality of engaging members at the first position or the second position.

12. The driving device according to claim 11, further comprising:

a release portion configured to move each of the plurality of engaging members, which is held at the first position or the second position by the stopper, from the second position to the first position.

13. A driving device comprising:

an ejection unit to which a fastener is supplied;

a striking unit operative to move in a first direction to hit the fastener supplied to the ejection unit and to move in a second direction, which is opposite to the first direction and wherein the striking unit has a rack; and a rotating member operative to rotate, wherein the rotating member includes a plurality of engaging members that are arranged at intervals along a rotation direction of the rotating member and that are engaged with and released from the rack by rotation of the rotating member, wherein each of the plurality of engaging members is movable between a first position of the rotating member which allows the engaging member to be engaged with the rack and a second position of the rotating member which do not allow the engaging member to be engaged with the rack, wherein the plurality of engaging members include:

a first engaging member configured to engage with the rack to move the striking unit in the second direction by transmitting a rotational force of the rotating member to the striking unit when positioned at the first position, and is released from the rack to allow the striking unit move in the first direction by rotation of the rotation member; and a second engaging member which is located behind the first engaging member in the rotation direction of the rotating member, wherein the second engaging member is located at the second position when the first engaging member is released from the rack and the striking unit is allowed to move in the first direction, and wherein the driving device further comprises a position changing member configured to move all the plurality of engaging members from the second position to the first position, relative to a center axis of the rotating member.

14. A driving device comprising:

an ejection unit to which a fastener is supplied;

a striking unit operative to move in a first direction to hit the fastener supplied to the ejection unit and to move in a second direction, which is opposite to the first direction and wherein the striking unit has a rack; and a rotating member operative to rotate, wherein the rotating member includes a plurality of engaging members that are arranged at intervals along a rotation direction of the rotating member and that are engaged with and released from the rack by rotation of the rotating member, wherein each of the plurality of engaging members is movable between a first position at which the engaging member is engaged with the rack to move the striking unit in the second direction by transmitting a rotational force of the rotating member to the striking unit and a second position which is different from the first position on the rotating member and at which the engaging member is released from the rack and the rotational force of the rotating member is not transmitted to the striking unit, and wherein a distance between the first position and a rotating center of the rotating member is longer than a distance between the second position and the rotating center of the rotating member, and a center of each engaging member moves between the first position and the second position.

* * * * *